US012121760B2

(12) United States Patent
Tarnawski

(10) Patent No.: US 12,121,760 B2
(45) Date of Patent: Oct. 22, 2024

(54) FIRE EXTINGUISHING OR FIRE PREVENTION DEVICE

(71) Applicant: Horst Tarnawski, Dresden (DE)

(72) Inventor: Horst Tarnawski, Dresden (DE)

(*) Notice: Subject to any disclaimer, the term of this patent is extended or adjusted under 35 U.S.C. 154(b) by 362 days.

(21) Appl. No.: 17/632,236

(22) PCT Filed: Apr. 20, 2020

(86) PCT No.: PCT/EP2020/060943
§ 371 (c)(1),
(2) Date: Feb. 1, 2022

(87) PCT Pub. No.: WO2021/023403
PCT Pub. Date: Feb. 11, 2021

(65) Prior Publication Data
US 2022/0273974 A1 Sep. 1, 2022

(30) Foreign Application Priority Data
Aug. 2, 2019 (DE) ...................... 10 2019 005 451.2

(51) Int. Cl.
*A62C 3/02* (2006.01)
*A62C 31/05* (2006.01)
(Continued)

(52) U.S. Cl.
CPC ............ *A62C 3/0242* (2013.01); *A62C 31/05* (2013.01); *A62C 31/24* (2013.01); *B64D 1/18* (2013.01); *B64U 10/10* (2023.01); *B64U 30/20* (2023.01)

(58) Field of Classification Search
CPC ....... A62C 3/0242; A62C 31/05; A62C 31/24; B64D 1/18
(Continued)

(56) References Cited

U.S. PATENT DOCUMENTS

| 2009/0126952 A1* | 5/2009 | Xuan-Do | A62C 3/0242 169/53 |
| 2012/0103636 A1* | 5/2012 | Ba-abbad | A62C 3/0242 169/16 |

(Continued)

FOREIGN PATENT DOCUMENTS

| DE | 654 782 A | 12/1937 |
| DE | 2 10 209 A1 | 6/1984 |

(Continued)

OTHER PUBLICATIONS

International Search Report and Written Opinion for corresponding PCT Patent Application No. PCT/EP2020/060943 dated Jun. 29, 2020.

(Continued)

*Primary Examiner* — Cody J Lieuwen
(74) *Attorney, Agent, or Firm* — Tarolli, Sundheim, Covell & Tummino LLP

(57) ABSTRACT

A fire extinguishing or fire prevention device comprises an extinguishing agent conduit arrangement. The extinguishing agent conduit arrangement comprises a plurality of longitudinal conduit elements each adapted to conduct a fire extinguishing agent therethrough, and a plurality of transverse conduit elements each adapted to conduct a fire extinguishing agent therethrough. Each of the longitudinal conduit elements is connected to one of the transverse conduit elements by at least one connecting element, the connecting elements each being suitable for further conducting the fire extinguishing agent from a longitudinal conduit element into a transverse conduit element or from a transverse conduit element into a longitudinal conduit element. Further, the fire extinguishing or fire prevention device comprises at least one extinguishing agent supply line; which is arranged at the extinguishing agent conduit arrangement and adapted to provide the fire extinguishing (Continued)

agent into at least one of the longitudinal conduit elements or the transverse conduit elements. Further, the fire extinguishing or fire prevention device comprises a plurality of outlets disposed on the extinguishing agent conduit arrangement and adapted to discharge the fire extinguishing agent from the extinguishing agent conduit arrangement. At least one flight-capable carrier device is disposed on the extinguishing agent conduit arrangement and adapted to lift and at least temporarily keep the extinguishing agent conduit arrangement with the outlets and at least a part of the fire extinguishing agent supply line in a distance from the ground surface. The extinguishing agent supply line of the fire extinguishing or fire prevention device is connected to an extinguishing agent reservoir adapted to provide the fire extinguishing agent to the extinguishing agent conduit arrangement while the extinguishing agent conduit arrangement is lifted or kept by the at least one flight-capable carrier device.

11 Claims, 9 Drawing Sheets

(51) Int. Cl.
*A62C 31/24* (2006.01)
*B64D 1/18* (2006.01)
*B64U 10/10* (2023.01)
*B64U 30/20* (2023.01)

(58) Field of Classification Search
USPC .............................................. 169/53
See application file for complete search history.

(56) References Cited

U.S. PATENT DOCUMENTS

| | | | |
|---|---|---|---|
| 2015/0344136 A1* | 12/2015 | Dahlstrom | G05D 1/0866 239/722 |
| 2016/0200437 A1* | 7/2016 | Ryan | B64U 10/60 244/99.2 |
| 2016/0318607 A1* | 11/2016 | Desai | B64D 1/16 |
| 2017/0043872 A1* | 2/2017 | Whitaker | A62C 3/0242 |
| 2018/0207456 A1* | 7/2018 | Katz | B05B 15/68 |
| 2019/0160315 A1* | 5/2019 | Head | G05D 1/0094 |

FOREIGN PATENT DOCUMENTS

| | | |
|---|---|---|
| DE | 10 2007 055 024 A1 | 5/2009 |
| WO | 2016016880 A1 | 2/2016 |
| WO | 2018046973 A2 | 3/2018 |

OTHER PUBLICATIONS

German Office Action for corresponding DE Patent Application No. 10 2019 005 451.2 dated Feb. 24, 2020.

* cited by examiner

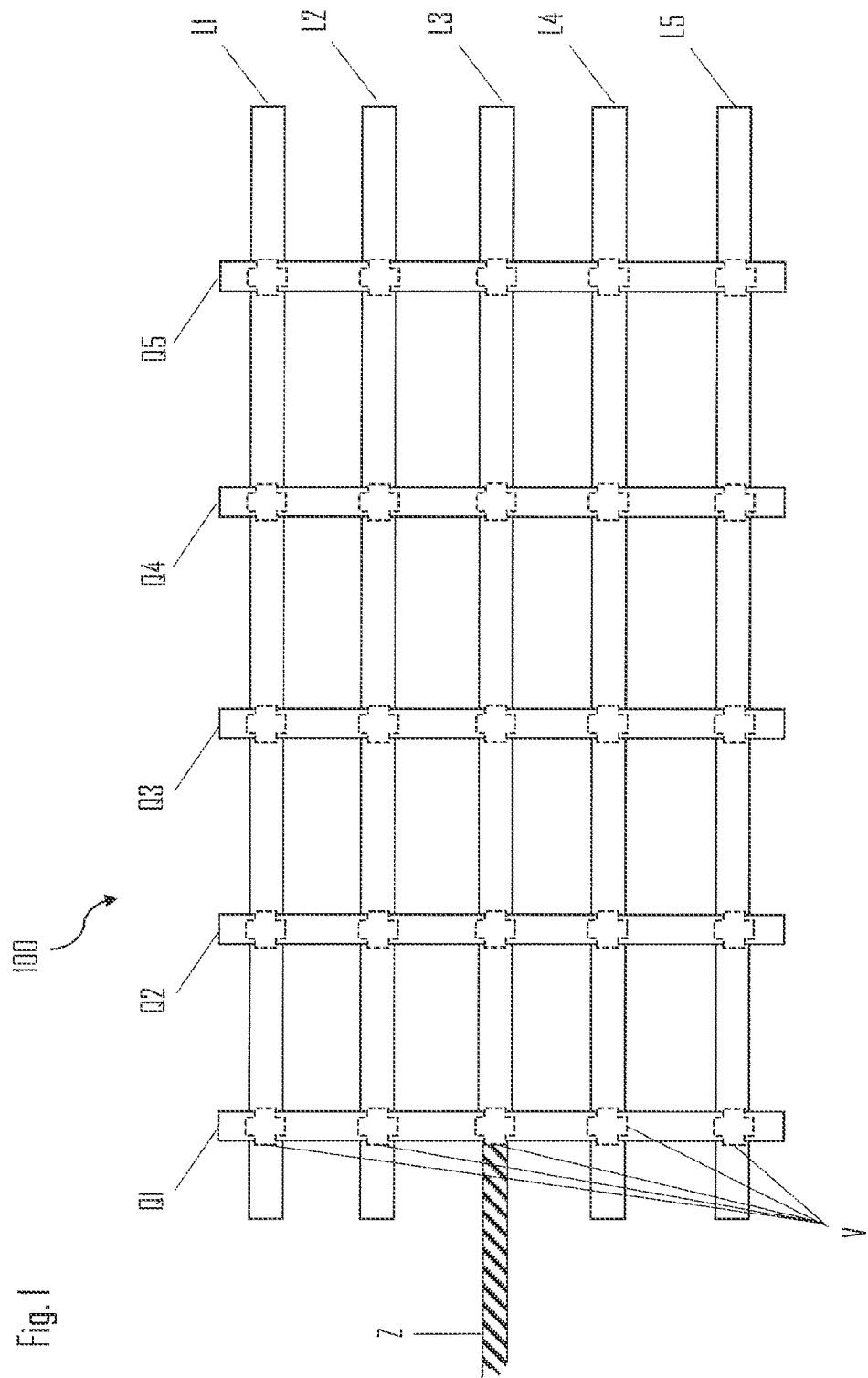

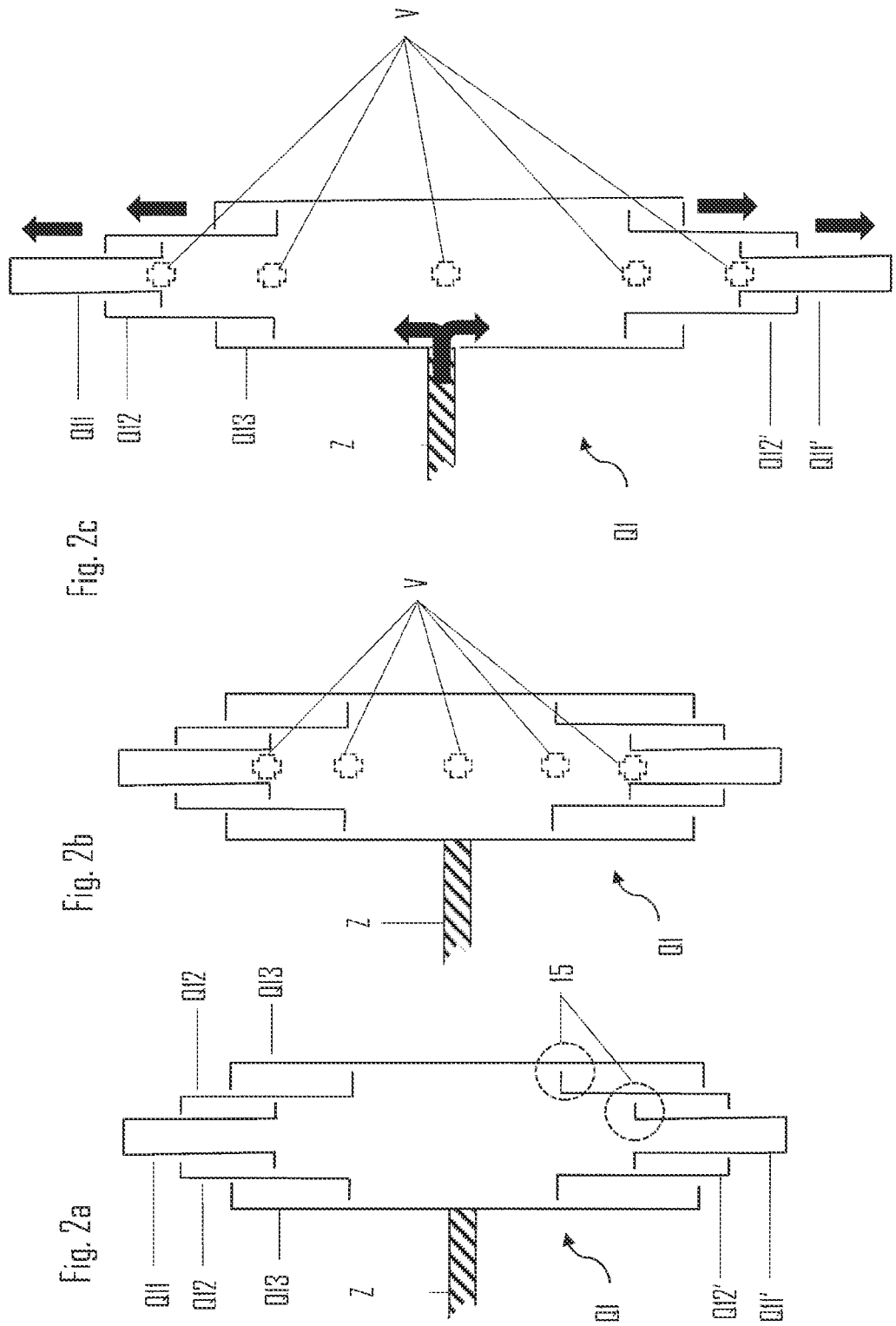

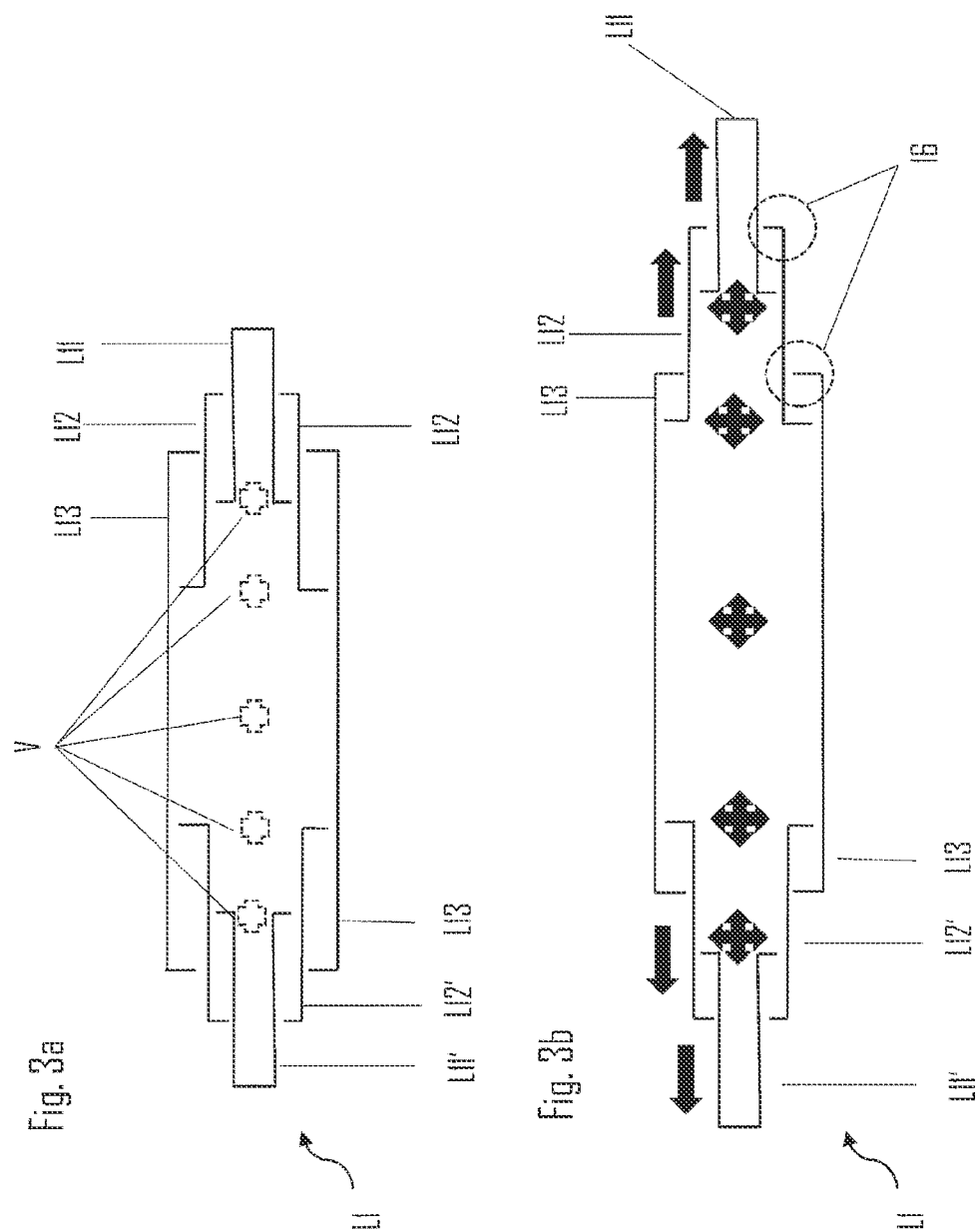

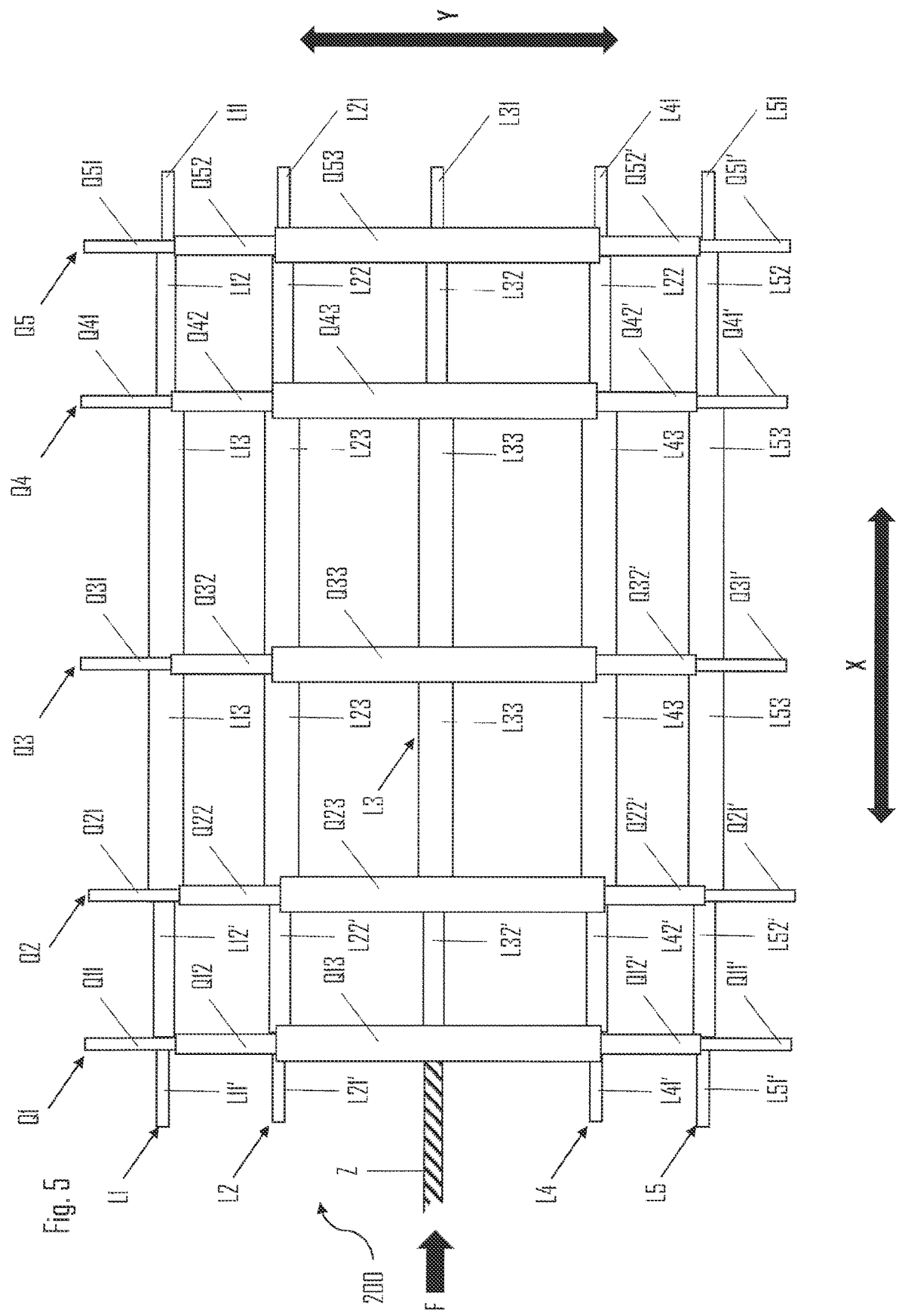

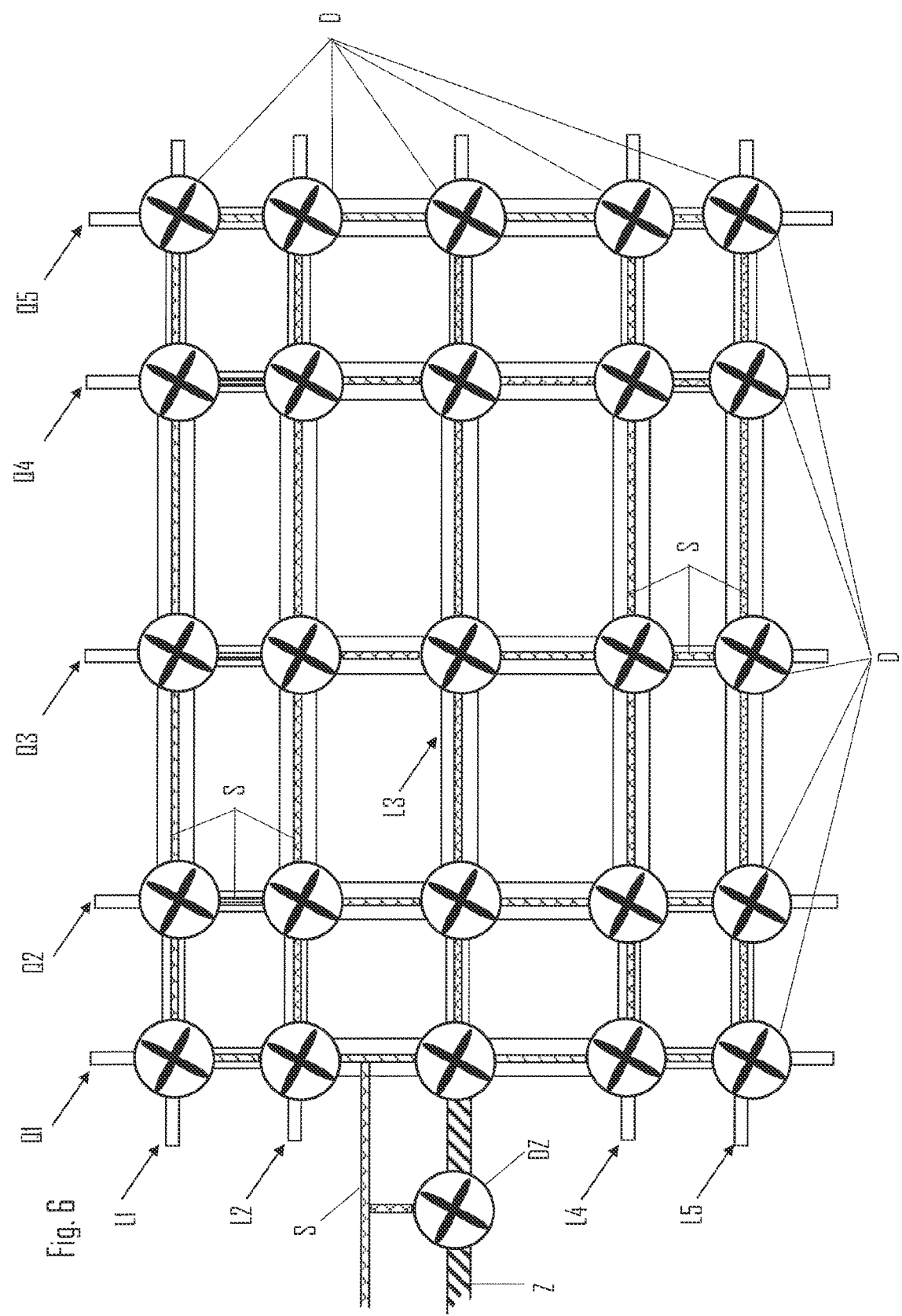

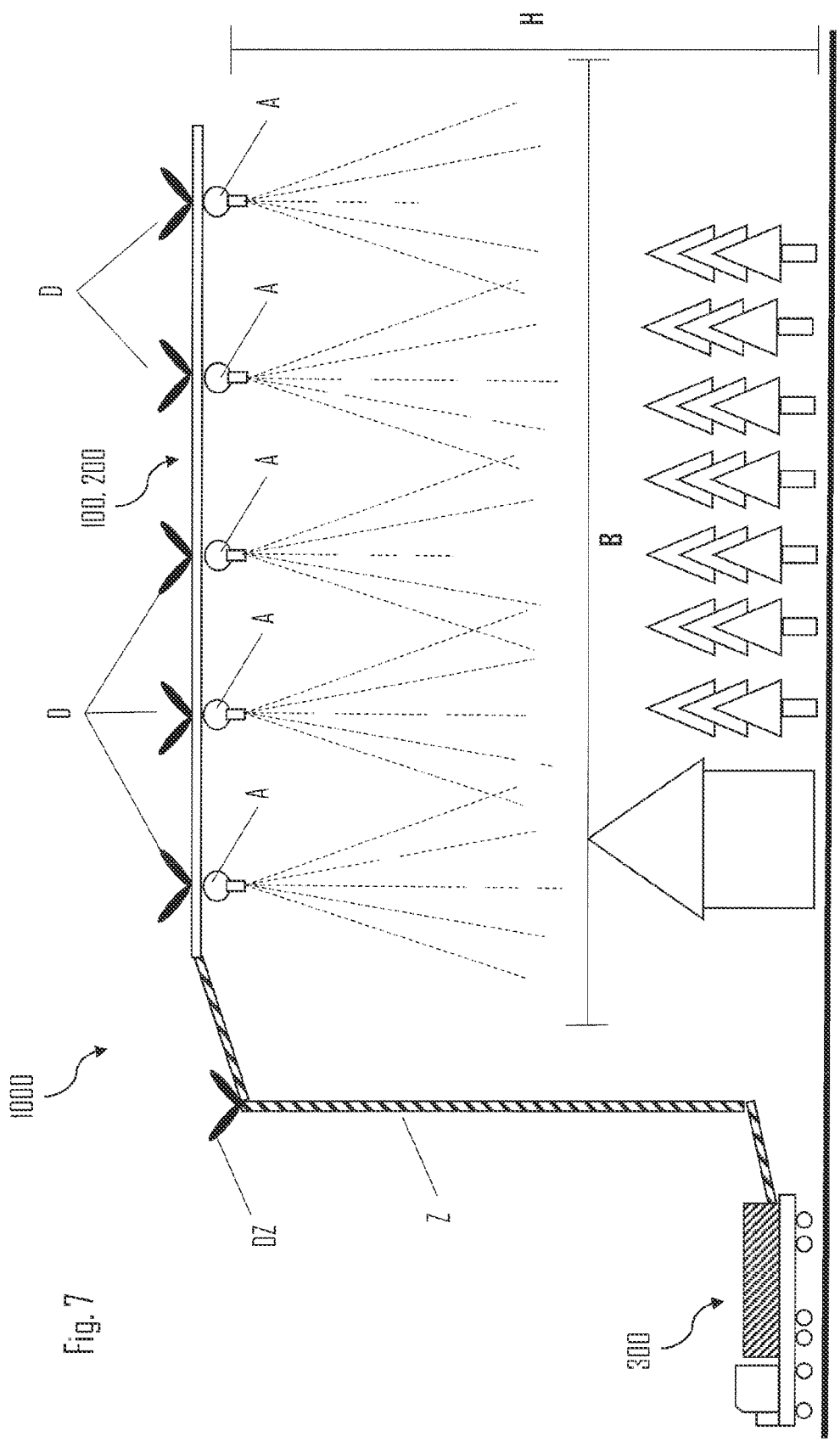

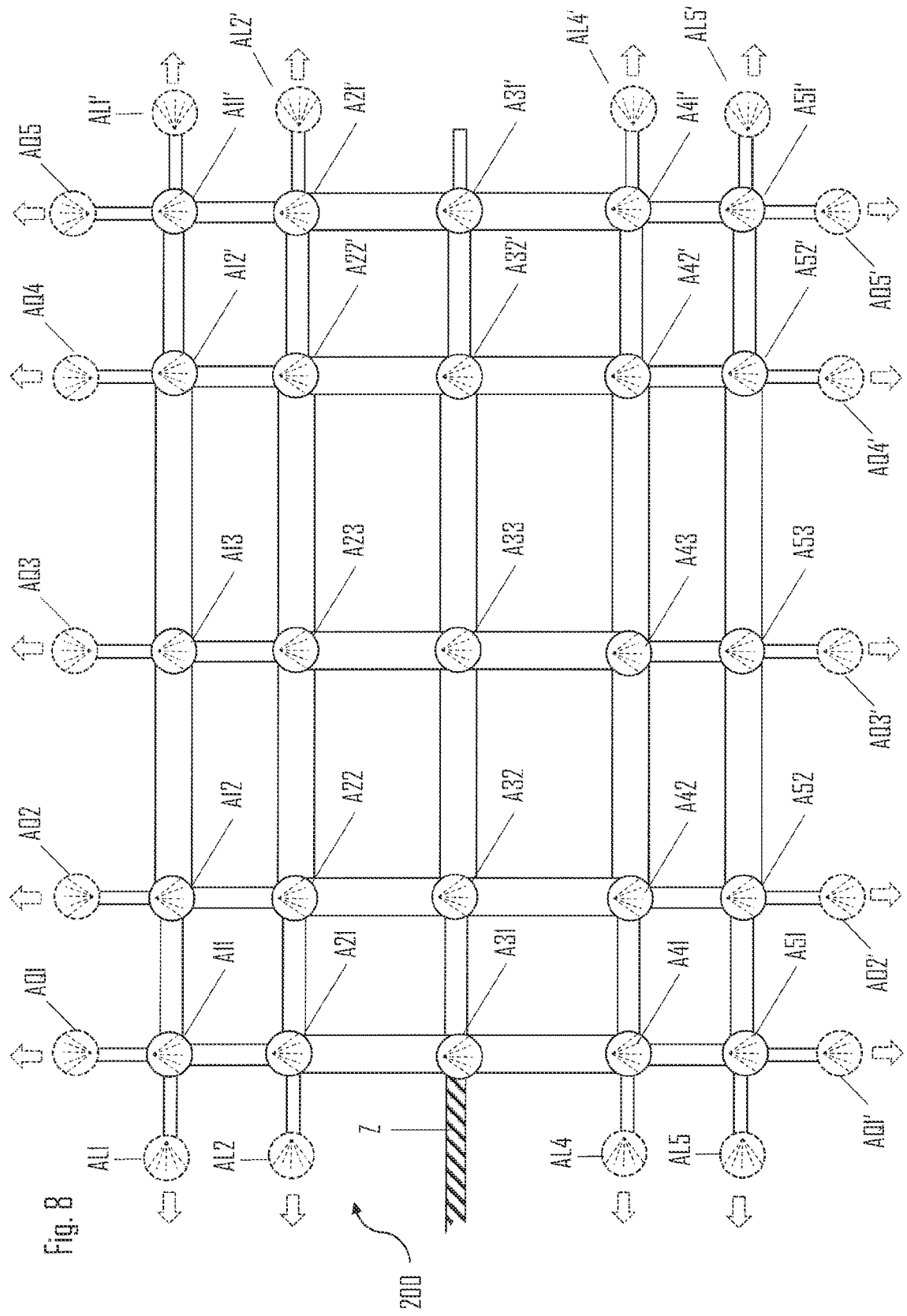

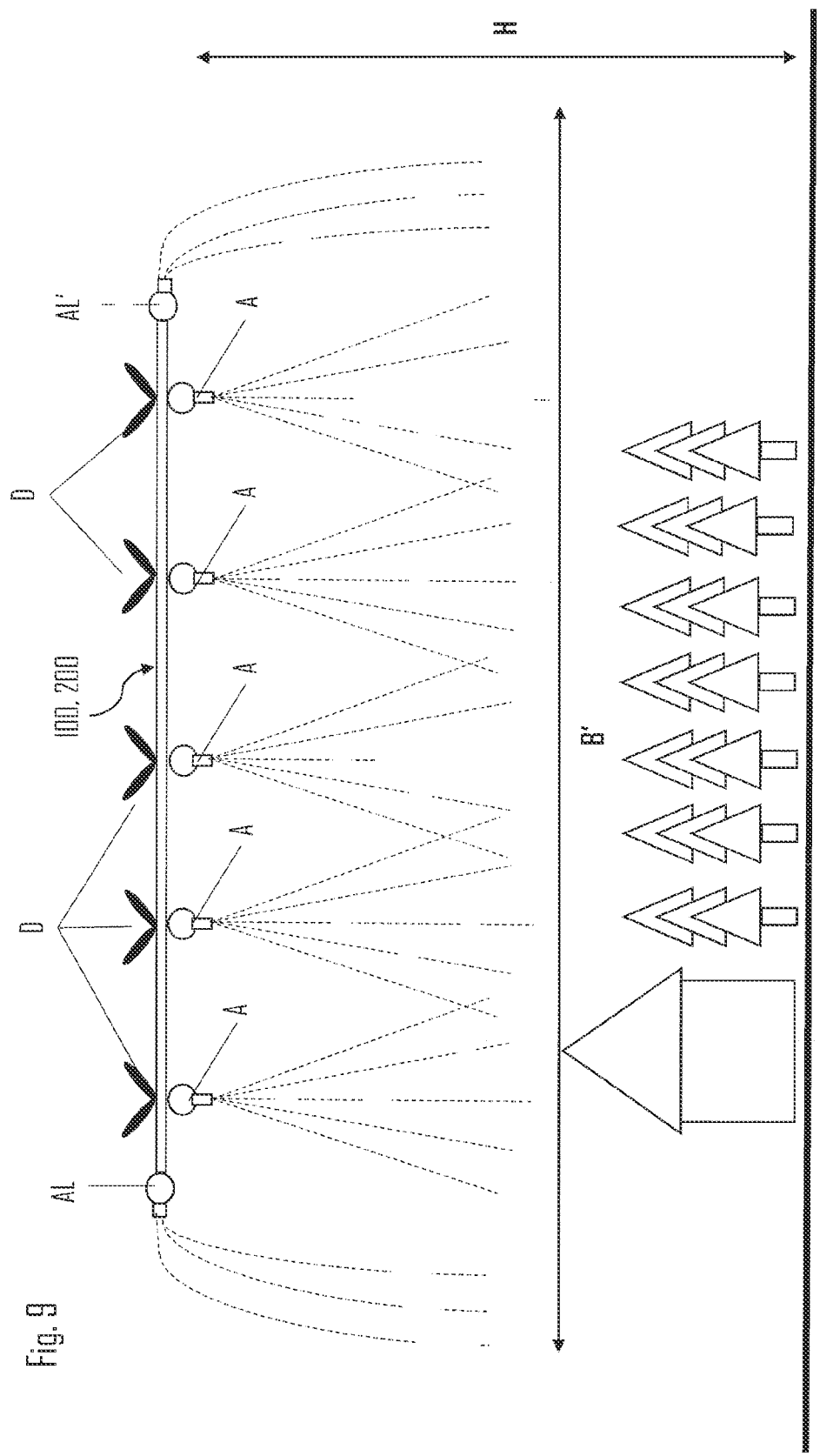

FIRE EXTINGUISHING OR FIRE PREVENTION DEVICE

RELATED APPLICATIONS

The present invention is a U.S. National Stage under 35 USC 371 patent application, claiming priority to Serial No. PCT/EP2020/060943, filed on Apr. 20, 2020; which claims priority from German Patent Application No. 10 2019 005 451.2 filed on Aug. 2, 2019; the entirety of both are hereby incorporated herein by reference.

A fire extinguishing or fire prevention device and a corresponding method are described herein.

In the case of wildfires, for example forest or bush fires, fire brigades and firefighting units are faced with several challenges. On the one hand, a fire area to be extinguished is often not or only with difficulty accessible for the fire brigades or fire extinguishing units. On the other hand, there is often no or at least no sufficient water supply available directly on site. Furthermore, due to occurring winds and the associated flying sparks, as well as for reasons of personal danger to be avoided, it is usually only possible for the fire extinguishing units to approach the source of the fire from the direction of the prevailing wind. In addition, the extinguishing of a wildfire, especially a spreading wildfire, with ground-based extinguishing technology is often only possible at specific points and is therefore not suitable for containing or completely extinguishing the fire.

A well-known solution is the use of fire-fighting aircraft and fire-fighting helicopters which, on the one hand, are very flexible and can also be used in inaccessible areas and, on the other hand, allow the delivery of extinguishing agents, in particular extinguishing water, from a great height, which is particularly suitable for fighting area fires due to the distribution of extinguishing agents over large areas—similar to a suddenly occurring heavy rain. However, the enormous operating and deployment costs of the fire-fighting aircraft and fire-fighting helicopters and their low availability are disadvantages here. Furthermore, it is particularly disadvantageous that the fire-fighting aircraft or fire-fighting helicopters can only carry a limited supply of extinguishing agent due to the respective maximum payload or load limit, which in addition can only be replenished after a landing at an airfield that is usually not located in the immediate vicinity, so that the fire-fighting aircraft or fire-fighting helicopters are always only available at intervals to fight a naturally permanent wildfire. Furthermore, the fuel supply of the fire-fighting aircraft or helicopters limits their operational radius and duration.

Document DE 654 782 A discloses a device for extinguishing fires that occur on the outside of an aircraft during flight operations.

Document DD 2 10 209 A1 discloses a water spray system for firefighting and also for space and area wetting comprising an assembly of piping, valves, connectors and spray nozzles adapted to wet a predetermined area with water.

The document DE 10 2007 055 024 A1 discloses a fire protection device for areas used for forestry or agriculture, which comprises an arrangement of frictionally connected pipes with slot-shaped outlet openings.

Despite existing devices for fire extinguishing and fire prevention, there is still a need for a device and a method to overcome the disadvantages described above, which occur in particular in the extinguishing of wildfires.

This task is solved by a device according to claim 1 and a method according to claim 10. Advantageous embodiments and further developments are defined by claims 2 to 9.

A fire extinguishing or fire prevention device proposed herein comprises an extinguishing agent conduit arrangement. The extinguishing agent conduit arrangement comprises a plurality of longitudinal conduit elements which are each suitable for conducting a fire extinguishing agent, in particular a liquid fire extinguishing agent, therethrough, and a plurality of transverse conduit elements which are each suitable for conducting a fire extinguishing agent, in particular a liquid fire extinguishing agent, therethrough.

For example, the longitudinal conduit elements and/or the transverse conduit elements may each be formed as tubes, hoses or hollow elements.

In the simplest case, a fire extinguishing agent can be extinguishing water. However, depending on the situation and availability, special fire extinguishing liquids and/or extinguishing water with special fire extinguishing additives can also be used, for example.

Each of the longitudinal conduit elements is connected to at least one of the transverse conduit elements by at least one connecting element, the connecting elements each being adapted to direct or conduct the fire extinguishing agent from a longitudinal conduit element into a transverse conduit element or from a transverse conduit element into a longitudinal conduit element.

In other words, it may be described that the connecting elements are each adapted to distribute the fire extinguishing agent between the longitudinal conduit elements and the transverse conduit elements. In one variant, each of the longitudinal conduit elements may be connected to each of the transverse conduit elements by at least one respective connecting element.

In one embodiment, the longitudinal conduit elements may each be arranged at least substantially orthogonally to the transverse conduit elements so that they jointly form a grid structure, in particular a Cartesian grid structure. However, this is not necessary in all embodiments. In particular, arrangements are possible in which the longitudinal conduit elements are each arranged at an angle of not equal to 90° to the transverse conduit elements, so that the longitudinal conduit elements form and/or enclose rhombical areas in cooperation with the transverse conduit elements.

The connecting elements may, for example, take the form of hose or pipe connectors, passage valves or (intermediate) conduit elements, each of which is arranged for enabling the fire extinguishing agent, in particular liquid fire extinguishing agent, to be transferred from a first conduit element to a second conduit element.

Optionally, the connecting elements can have controllable valves which, automatically or initiated by an operator of the fire extinguishing or fire prevention device, release or block a passage of the, in particular liquid, fire extinguishing agent. The individual connecting elements can be controlled individually, in groups and/or jointly.

On the one hand, the connecting elements mechanically fix the respective longitudinal conduit elements and the respective transverse conduit elements to one another and, on the other hand, establish extinguishing agent passages between the longitudinal conduit elements and the transverse conduit elements. Optionally, the fire extinguishing or fire prevention device may also comprise additional fastening elements, which establish and/or support a mechanically loadable connection of the longitudinal conduit elements to the transverse conduit elements.

Further, the fire extinguishing or fire prevention device comprises at least one extinguishing agent supply line arranged on the extinguishing agent conduit arrangement and adapted to introduce the fire extinguishing agent into at least one of the longitudinal conduit elements or the transverse conduit elements.

For example, the extinguishing agent supply line may be configured as a tube, a hose, a hollow element, or a combination of the foregoing examples. For example, the extinguishing agent supply line may be formed at least partially as a hose and/or at least partially as a tube.

The extinguishing agent supply line can be coupled to one of the longitudinal conduit elements or one of the transverse conduit elements, so that the supply of the fire extinguishing agent to the interior of a longitudinal conduit element and/or a transverse conduit element is enabled. For this purpose, at least one of the longitudinal conduit elements and/or the transverse conduit elements may comprise a receiving or coupling device configured for a mechanically loadable connection to the extinguishing agent supply line, wherein the, in particular liquid, fire extinguishing agent may be introduced from the extinguishing agent supply line into the longitudinal conduit element and/or the transverse conduit element through the receiving or coupling device. For example, at least one of the longitudinal conduit element and/or the transverse conduit element may comprise a hose receptacle configured for receiving and fixing a commercially available fire hose, wherein the fire extinguishing agent may be supplied through the fire hose and the hose receptacle into the longitudinal conduit element and/or the transverse conduit element.

Further, the fire extinguishing or fire prevention device comprises a plurality of outlets each arranged on the extinguishing agent conduit arrangement and adapted to discharge the fire extinguishing agent from the extinguishing agent conduit arrangement.

In particular, the outlets may be arranged on the longitudinal conduit elements and/or the transverse conduit elements. In the simplest case, the outlets may be formed by openings in the longitudinal conduit elements and/or the transverse conduit elements which allow the fire extinguishing agent to exit the fire extinguishing or fire prevention device. However, in particular at least part of the outlets or all of the outlets may be formed as extinguishing agent spray nozzles and/or extinguishing agent sprinkler nozzles which are arranged, for example, on the longitudinal conduit elements and/or the transverse conduit elements and are arranged to allow fire extinguishing agent introduced into the longitudinal conduit elements and/or the transverse conduit elements to be discharged from the fire extinguishing or fire prevention device. An extinguishing agent spray nozzle herein refers to a technical device for influencing the liquid fire extinguishing agent as it passes from a pipe flow into free space. An extinguishing agent spray nozzle refers to a technical device for separating a continuous fire extinguishing agent flow into several fire extinguishing agent jets or fire extinguishing agent drops.

At least one flight-capable carrier device is arranged on the extinguishing agent conduit arrangement or mechanically loadably connected to the extinguishing agent conduit arrangement and is suitable for lifting the extinguishing agent conduit arrangement with the outlets and at least a part of the extinguishing agent supply line to a distance from the ground surface and for keeping there it at least temporarily.

In one embodiment, a plurality of flight-capable carrier devices may be arranged on or mechanically loadably connected to the extinguishing agent conduit arrangement. For example, sixty or more of the flight-capable carrier devices may also be arranged on or mechanically loadably connected to the extinguishing agent conduit arrangement.

In particular, a flight-capable carrier device may be a technical device capable of autonomous flight, i.e. capable of lifting off from the ground surface and moving spatially in the earth's atmosphere. For example, the flight-capable carrier device may be an unmanned aerial vehicle, UAV. In particular, the flight-capable carrier device may be a drone, preferably a helicopter drone, which has a rotary wing or rotary wing arrangement for establishing flight capability.

Lifting to a distance from the ground surface means a movement of the flight-capable carrier device(s) and the device elements mechanically connected to it/they in a direction away from the ground surface.

Keeping, in particular keeping the flight-capable carrier device(s) and the device elements mechanically connected to it/they at a distance from the ground surface refers to a positioning of the flight-capable carrier device(s) and the device element(s) mechanically connected thereto at a predetermined or predeterminable position in the earth's atmosphere, wherein between the ground surface and the at least one flight-capable carrier device and the device element(s) mechanically connected thereto is at least substantially no or only slight relative movement, at least for a predetermined or predeterminable time interval.

The extinguishing agent supply line of the fire extinguishing or fire prevention device is connected to an extinguishing agent reservoir adapted to provide and/or supply the fire extinguishing agent to the extinguishing agent conduit arrangement, while the extinguishing agent conduit arrangement is lifted or kept at a distance from the ground surface by the at least one flight-capable carrier device.

An extinguishing agent reservoir in the sense of the invention may be any, in particular ground-based, stationary or deployable technical device or natural fire extinguishing agent source which is adapted for providing a fire extinguishing agent, for example extinguishing water. For example, the extinguishing agent reservoir may be a tanker, a connection to a stationary technical water supply, in particular a hydrant, a river, a pond or lake, a pool or swimming pool and/or a water reservoir or dam. The extinguishing agent reservoir may be adapted to be connected to the extinguishing agent supply line, for example with a hose, to enable the supply of the fire extinguishing agent to the extinguishing agent conduit arrangement.

To enable the fire extinguishing agent to be supplied to the extinguishing agent conduit arrangement, which is lifted or kept by the at least one flight-capable carrier device, the extinguishing agent reservoir, for example a tanker or fire engine, may comprise an extinguishing agent pump. Alternatively or additionally, such an extinguishing agent pump may be provided separately, for example in the case of fire extinguishing agent extraction from a lake. Such an extinguishing agent pump may be a commercially available fire pump which pumps a fire extinguishing agent, for example at a pressure of forty bar, into the extinguishing agent supply line.

An advantage of the fire extinguishing or fire prevention device according to the invention is that, similar to a fire-fighting aircraft or a fire-fighting helicopter, fire extinguishing can be effectively and flexibly performed by releasing fire extinguishing agent above a desired location of the ground surface, in particular above a fire or fire prevention area. However, in contrast to a fire-fighting aircraft or a fire-fighting helicopter, the fire extinguishing or fire prevention device proposed herein can be supplied, quasi-endlessly, with a continuously deliverable fire-extinguishing agent and/or with operating energy and/or operating fuel by one or more ground-based devices and/or by one or more natural fire-extinguishing agent reservoir(s), so that a duration of use is not limited and fire-fighting or fire-prevention can be performed continuously.

A further advantage of the fire extinguishing or fire prevention device according to the invention is that, in contrast to fire-fighting aircraft or fire-fighting helicopters, no operating energy has to be expended for lifting an extinguishing agent reservoir or extinguishing agent supply, since the extinguishing agent can be supplied from a ground-based extinguishing agent reservoir or extinguishing agent supply.

Furthermore, an advantage of the fire extinguishing or fire prevention device according to the invention is that, in contrast to the use of fire-fighting aircraft or fire-fighting helicopters, no or hardly any relevant air turbulence or wake vortices occur due to the extinguishing agent conduit arrangement kept at a distance from the ground surface, which make an outlet of the fire extinguishing agent more difficult or at least undesirably influence it, for example by a deflection of an extinguishing agent jet that has been discharged.

Optionally, at least a portion of the outlets may be extinguishing agent spray nozzles or extinguishing agent sprinkler nozzles and/or at least a portion of the outlets may discharge the fire extinguishing agent at least substantially perpendicular to the ground surface.

An advantage here is that at least no substantial impulse or force effects on the fire extinguishing or fire prevention device through the extinguishing agent outlet, which impulse or force forces the fire extinguishing or fire prevention device from a predetermined and/or predeterminable position in the earth's atmosphere, in particular from a position above a fire to be fought. When the fire extinguishing agent is delivered substantially perpendicular to the ground surface, the opposing forces caused by the extinguishing agent outlet effecting on the extinguishing agent conduit arrangement and the device elements mechanically coupled thereto are easily to be compensated by the flight-capable carrier devices lifting or keeping the extinguishing agent conduit arrangement and the device elements mechanically connected thereto by adjusting the operating power.

In other words, it can be described that the counterforces occurring during a discharge of fire extinguishing agent performed at least substantially perpendicular to the surface of the earth, which counterforces effect on the extinguishing agent conduit arrangement and the device elements mechanically connected thereto, effect on the extinguishing agent conduit arrangement and the device elements mechanically connected thereto at least substantially parallel to the gravitational force of the earth. The discharge of a fire extinguishing agent is thus in particular to be regarded as substantially perpendicular to the surface of the ground if the counterforces or impulses caused by the fire extinguishing agent discharge, which respectively effect on the extinguishing agent conduit arrangement and the device elements mechanically connected thereto, effect on the extinguishing agent conduit arrangement and the device elements mechanically coupled thereto at least substantially parallel to the gravitational force of the earth.

In a further embodiment, at least some of the outlets may discharge the fire extinguishing agent at least substantially parallel to the ground surface. For this purpose, outlets, in particular extinguishing agent spray nozzles or extinguishing agent sprinkling nozzles, can be formed, for example, laterally at the ends of the longitudinal conduit elements and/or laterally at the ends of the transverse conduit elements, the outlets being located opposite one another in pairs in each case.

An advantage here is that a counterforce caused by a fire extinguishing agent discharged at least substantially parallel to the ground or an impulse caused by a fire extinguishing agent discharged at least substantially parallel to the ground, which impulse effects on the extinguishing agent conduit arrangement, is at least partially compensated by a force opposite to the counterforce or an impulse opposite to the impulse, which impulse is also caused by a discharge of fire extinguishing agent.

Optionally, the fire extinguishing or fire prevention device may comprise at least one flight-capable supply line carrier device arranged on the extinguishing agent supply line and adapted to lift at least a portion of the extinguishing agent supply line to a distance from the ground surface and to keep the extinguishing agent supply line at least temporarily at a distance from the ground surface. The extinguishing agent supply line, which is connected to the extinguishing agent reservoir, can thereby supply the fire extinguishing agent to the extinguishing agent conduit arrangement, while the extinguishing agent supply line is lifted or kept by the at least one flight-capable supply line carrier device.

An advantage here is that the extinguishing agent supply line, which is for example a hose which, at least in an operating state filled with fire extinguishing agent, can have a not inconsiderable weight depending on the position of the extinguishing agent conduit arrangement or its distance from the ground surface, can be lifted and/or held by the at least one supply line carrier device, which can for example be an unmanned aerial vehicle, in particular a drone. This reduces the total weight to be lifted and/or held in a position in the earth's atmosphere by the flight-capable/carrier device(s) arranged on the extinguishing agent conduit arrangement. The flight-capable/carrier device/s, which is/are arranged on the extinguishing agent conduit arrangement, is/are thus relieved.

Optionally, a plurality of supply line carrier devices may be arranged on the extinguishing agent supply line. In particular, the multiple supply line carrier devices can each be arranged at a regular distance of, for example, five or ten meters from one another on the extinguishing agent supply line.

Further, the fire extinguishing or fire prevention device may comprise at least one operating energy and/or fuel supply line connected to the at least one flight-capable carrier device and/or to the at least one flight-capable supply line carrier device and adapted to supply the at least one flight-capable carrier device and/or the at least one flight-capable supply line carrier device with operating energy and/or fuel. The operating fuel may be a liquid operating fuel, for example a petroleum-based operating fuel. In particular, the operating fuel may be (aircraft) gasoline or kerosene.

An advantage here is that the operating energy supply line can be connected to a stationary or deployable ground-based energy and/or fuel supply device, which can provide a quasi-endless, in particular electrical, operating energy for the at least one flight-capable carrier device and/or the flight-capable supply line carrier device(s). Thus, a duration of use of the fire extinguishing or fire prevention device is not limited by a supply of operating energy or fuel/fuel to be carried. Alternatively or additionally, the at least one flight-capable carrier device and/or the at least one flight-capable supply line carrier device may also have or comprise energy storage means, for example accumulators, which permit short-term operation of the fire extinguishing or fire prevention device even without a ground-based energy supply device and/or to bridge short-term failures of the ground-based energy supply device, for example in the case of a generator change or a changeover of an energy supply device. Furthermore, the short-term power supply by means of one or more accumulator(s) can also be used for a controlled landing or return maneuver of the fire extinguishing or fire prevention device in the event of an accidental failure of the ground-based power supply device.

Furthermore, other device elements, for example controllable connecting elements or controllable outlets, can also be supplied with operating energy, in particular electrical operating energy, by the operating energy supply line.

Also, the fire extinguishing or fire prevention device may comprise at least one control line connected to the at least one flight-capable carrier device and/or to the at least one flight-capable supply line carrier device and arranged to provide a control signal to the at least one flight-capable carrier device and/or to the at least one flight-capable supply line carrier device.

An advantage here is that the control line can be connected to a stationary or deployable ground-based control device, for example to an electronic data processing system, wherein the control device provides control signals for the at least one flight-capable carrier device and/or the at least one flight-capable supply line carrier device. Alternatively or additionally, a radio remote control device may be provided for the at least one flight-capable carrier device and/or for the at least one flight-capable supply line carrier device. Furthermore, further device elements, for example controllable connection elements or controllable outlets may also be (remotely) controlled and/or regulated by the control line or by means of a radio remote control.

In one embodiment, at least a portion of the longitudinal conduit elements and/or the transverse conduit elements may each comprise a fabrication material with or of metal, in particular with or of steel, aluminum and/or titanium, and/or plastics, in particular carbon fiber reinforced plastics, CFRP.

An advantage here is that the use of lightweight materials such as aluminum, titanium or carbon fiber reinforced plastic can reduce the weight of the fire extinguishing or fire prevention device. This relieves the load on the flight-capable carrier device(s) which lifts or keeps the extinguishing agent conduit arrangement and the device elements mechanically connected to it.

Optionally, at least a part of the longitudinal conduit elements and/or of the transverse conduit elements may each be formed as a telescopic element, each telescopic element comprising at least one, in particular tubular, inner element and one, in particular tubular, outer element at least partially surrounding the inner element, the inner element being displaceable relative to the outer element. Explicitly, also embodiments are possible in which a plurality of inner elements arranged at least partially within one another and an outer element each form one or more longitudinal conduit elements and/or one or more transverse conduit elements. For example, each of four inner elements and one outer element arranged at least partially within one another may each form one longitudinal conduit element and/or one transverse conduit element, wherein the inner elements and the outer element of a telescopic element may each be displaceable relative to one another.

At least one of the inner elements of the telescopic element, in particular an innermost one of the inner elements of the telescopic element, may be closed and/or closable at an outer end. For example, an inner element of the telescopic element may have a tubular shape with a bag end impermeable to fire extinguishing agent. Alternatively, a closable and/or controllable outlet may be arranged at an end of an inner element.

The displacement of an inner element relative to the outer element and/or a further inner element may be caused at least in part by a physical pressure inside the longitudinal conduit elements and/or the transverse conduit elements, which in this case are each formed as telescopic elements, wherein the physical pressure may be caused in particular by the introduction of the fire extinguishing agent into the extinguishing agent conduit arrangement.

Alternatively or additionally, the displacement of the inner element relative to the outer element and/or a further inner element may be effected at least in part by a cable pull mechanism and/or an electromechanical displacement device.

An advantage of the design of the longitudinal conduit elements or the transverse conduit elements as telescopic elements is that the fire extinguishing or fire prevention device can be brought into a compact transport state for transport, for example for transport on a commercial truck, in which the inner elements are arranged in each case for the predominant part in the respective outer elements, while a fire extinguishing agent discharge from the fire extinguishing or fire prevention device in an operating state, in which the inner elements may be predominantly displaced out of the outer elements, may be effected via a discharge area which is enlarged in comparison with the transport state of the fire extinguishing or fire prevention device. In other words, it can be described that by means of the telescopic elements, on the one hand, a transportability of the fire extinguishing or fire prevention device can be ensured by means of a commercial truck, whereby the extinguishing agent conduit arrangement for an operational state of the fire extinguishing or fire prevention device can be enlarged with respect to its transport dimensions. This allows a distance of the outlets arranged on the extinguishing agent conduit arrangement to be increased relative to each other, so that the fire extinguishing agent can be distributed over a larger area.

At least a part of the airworthy carrier device(s) may be arranged on or mechanically connected to the outer elements and/or the inner elements.

The outer elements and/or the inner elements may optionally each comprise seals which prevent or at least reduce an escape of fire extinguishing agent in a connecting region between the outer elements and the inner elements and/or between two inner elements which are each partially positioned or arranged one inside the other. However, this is not necessary in all embodiments, since at least a partial leakage of fire extinguishing agent from the connecting regions of a telescopic element is not detrimental to the intended use of the fire extinguishing or fire prevention device.

Furthermore, a displacement of the inner elements of a telescopic element relative to the outer element and/or a further inner element of the telescopic element may be effected or occur before and/or during and/or after a lifting of the extinguishing agent conduit arrangement and the device elements mechanically connected thereto by the at least one flight-capable carrier device. In other words, it may be described that the longitudinal conduit elements or the transverse conduit elements, which may be at least partially formed as telescopic elements, may be extended or retracted or displaced relative to each other in a deployment preparation state of the fire extinguishing or fire prevention device on the ground surface, or may be extended or retracted or displaced relative to each other during an already ongoing flight operation of the fire extinguishing or fire prevention device. If a plurality of flight-capable carrier devices, which are respectively arranged on the outer elements and/or the inner elements, are used, these can at least support a displacement of the inner elements relative to the outer elements and/or further inner elements in each case. The flight-capable carrier devices, which can be UAVs, in particular drones, for example, can be controlled or regulated in their flight path manually or with the aid of an electronic control system.

In a further embodiment, the fire extinguishing or fire prevention device comprises a control device, in particular an electronic data processing system, which is adapted for controlling and/or regulating the at least one flight-capable carrier device and/or the at least one flight-capable supply line carrier device and/or one or more outlets and/or a displacement of the inner elements and/or a lifting or keeping or a positioning of the fire extinguishing or fire prevention device. For this purpose, the electronic data processing system may comprise predefined operating programs and/or an input device for one or more operators of the fire extinguishing or fire prevention device. The input device may be arranged to enable an operator to control or regulate the fire extinguishing or fire prevention device and/or individual device components and/or individual functions of the fire extinguishing or fire prevention device. Further, the control device, which may be, for example, an electronic data processing system, may comprise a visually perceptible output device, for example, a display screen and/or an illuminated display, which indicates to one or more operators of the fire extinguishing or fire prevention device an operating status and/or individual operating parameters, such as, for example, a flight altitude or an actual discharging amount of a fire extinguishing agent.

Furthermore, the control device can in particular be set up to control and/or regulate and/or coordinate with one another or synchronize with one another the flight movements and/or individual operating parameters of a plurality of flight-capable carrier devices and/or flight-capable supply carrier devices. This can be done in particular with the aid of predefined control and/or regulation algorithms which can be stored in the control device, which can in particular be an electronic data processing device.

Further, the control device may be configured to at least substantially compensate for occurring air movements, which may be caused by winds or by air heated by a fire, by selectively controlling individual or multiple flight-capable carrier devices and/or flight-capable supply line carrier devices, thereby ensuring that the extinguishing agent conduit arrangement and the device elements mechanically connected thereto are kept in a predetermined or predeterminable position in the earth's atmosphere. In other words, it may be described that by controlling and/or regulating the at least one flight-capable carrier device and/or the at least one flight-capable supply line carrier device, the control device may ensure a position of the extinguishing agent conduit arrangement and the device elements mechanically connected thereto in the earth's atmosphere even under the influence of airstreams moving relative to the ground surface and/or to the fire extinguishing or fire prevention device.

In one embodiment, the control device may be arranged to cause an audibly perceptible warning signal to be given to the operator(s) of the fire extinguishing or fire prevention device in the event of the occurrence of a predefined event, for example an interruption of a fire extinguishing agent supply from the fire extinguishing agent reservoir or a failure of the ground-based energy or fuel supply device.

Furthermore, the fire extinguishing or fire prevention device may comprise at least one sensor device, in particular a smoke sensor device and/or an optically detecting sensor device and/or a heat or temperature detecting sensor device adapted to detect a fire or a part of a fire, in particular a fire source or an ember nest, and/or a fire spread direction. For example, the sensor device may be arranged on the extinguishing agent conduit arrangement. Optionally, the sensor device may forward a detection result, for example via the control line and/or via a radio data link, to the control device, which takes the detection result into account in a, in particular automated, control and/or regulation of the fire extinguishing or fire prevention device. Alternatively or additionally, the detection result can be displayed to the one or more operators of the fire extinguishing or fire prevention device by the output device.

A method for fire prevention and extinguishing a fire includes the steps of:
   Providing a fire extinguishing or fire prevention device according to the preceding description;
   Providing an extinguishing agent reservoir which stores or supplies an extinguishing agent, in particular a liquid extinguishing agent;
   Lifting the extinguishing agent conduit assembly and at least a portion of the extinguishing agent supply line with the at least one flight-capable carrier device to a predetermined distance from the ground surface;
   Relocating the extinguishing agent conduit arrangement and at least a portion of the extinguishing agent supply line over a predetermined target area;
   Introduction of the fire extinguishing agent from the extinguishing agent reservoir into the extinguishing agent conduit arrangement through the extinguishing agent supply line;
   Discharge of the fire extinguishing agent from the extinguishing agent conduit arrangement.

The target area in this case denotes a part of the earth's surface which is predetermined or can be predetermined by an operator or the control device and which is intended for fire extinguishing and/or fire prevention. The at least one flight-capable carrier device and/or the at least one flight-capable supply line carrier device are arranged to hold or displace the extinguishing agent conduit arrangement and at least a part of the extinguishing agent supply line with the at least one flight-capable carrier device to a predetermined distance from the ground surface and/or over a predetermined target area and/or in a predetermined or predeterminable position in the earth's atmosphere, in particular over a predetermined target area.

Further objectives, features, advantages and possible applications result from the following description of non-limiting examples of embodiments with reference to the corresponding drawings. In this connection, all the features described and/or illustrated show, individually or in any combination, the object disclosed herein, also irrespective of their grouping in the claims or their back-relationships. The dimensions and proportions of the components shown in FIGS. are explicitly not in scale.

FIG. 1 shows schematically and by way of example an extinguishing agent conduit arrangement having a plurality of longitudinal conduit elements, each of which is suitable for conducting a liquid fire extinguishing agent therethrough, and a plurality of transverse conduit elements, each of which is suitable for conducting a liquid fire extinguishing agent therethrough.

FIG. 2 shows schematically and by way of example a transverse conduit element which is designed as a telescopic element with an outer element and a plurality of inner elements.

FIG. 3 shows schematically and by way of example a longitudinal conduit element which is designed as a telescopic element with an outer element and a plurality of inner elements.

Figure 4A:
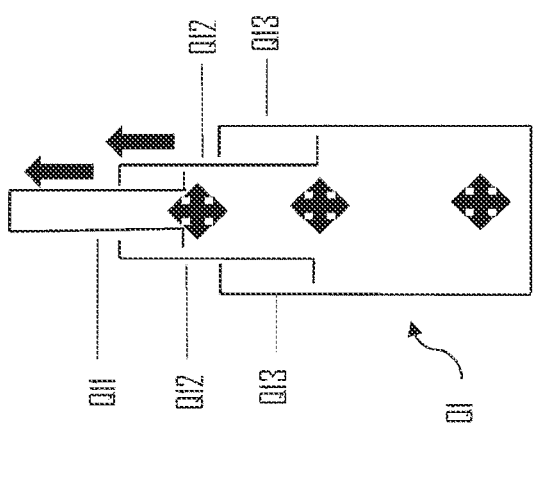
FIG. 4 shows schematically and by way of example a further transverse conduit element and a further longitudinal conduit element, each of which is in the form of a telescopic element having an outer element and a plurality of inner elements.

FIG. 5 shows schematically and exemplarily an extinguishing agent conduit arrangement having a plurality of longitudinal conduit elements, each of which is suitable for conducting a liquid fire extinguishing agent therethrough, and a plurality of transverse conduit elements, each of which is suitable for conducting a liquid fire extinguishing agent therethrough, wherein the longitudinal conduit elements and the transverse conduit elements are each configured as telescopic elements.

FIG. 6 shows schematically and by way of example an extinguishing agent conduit arrangement having a plurality of longitudinal conduit elements, which are each suitable for conducting a liquid fire extinguishing agent therethrough, and a plurality of transverse conduit elements, which are each suitable for conducting a liquid fire extinguishing agent therethrough, wherein the longitudinal conduit elements and the transverse conduit elements are each in the form of telescopic elements and wherein a plurality of flight-capable carrier devices are arranged on the extinguishing agent conduit arrangement.

FIG. 7 shows schematically and exemplarily a fire extinguishing or fire prevention device in an operating condition.

FIG. 8 shows schematically and by way of example a possible arrangement of outlets on an extinguishing agent conduit arrangement having a plurality of longitudinal conduit elements and a plurality of transverse conduit elements, the longitudinal conduit elements and the transverse conduit elements each being in the form of telescopic elements.

FIG. 9 shows schematically and by way of example another fire extinguishing or fire prevention device in an operating condition.

Comparable or identical and identically acting components and features are each provided with the same reference signs in the figures. In part, reference signs for individual features and components have also been omitted in the figures for reasons of clarity, whereby these features and components are already provided with reference signs in other figures. The components and features that are not described again in relation to the further figures are similar in their design and function to the corresponding components and features according to the other figures.

FIG. 1 shows an example of an extinguishing agent conduit arrangement 100 with five longitudinal conduit elements L1, L2, L3, L4, L5 and five transverse conduit elements Q1, Q2, Q3, Q4, Q5 in a top view. However, embodiments of the extinguishing agent conduit arrangement 100 with any number of longitudinal conduit elements and transverse conduit elements are explicitly also possible, wherein a respective number of the longitudinal conduit elements and the transverse conduit elements may be identical or different.

The longitudinal conduit elements L1, L2, L3, L4, L5 are each arranged parallel to one another and each arranged at a right angle with respect to the transverse conduit elements Q1, Q2, Q3, Q4, Q5. The transverse conduit elements Q1, Q2, Q3, Q4, Q5 are also arranged parallel to each other. In the example shown, the longitudinal conduit elements L1, L2, L3, L4, L5 and the transverse conduit elements Q1, Q2, Q3, Q4, Q5 are each formed as cylindrical aluminum tubes suitable for the passage of extinguishing water. However, in other embodiments, the transverse conduit elements and/or longitudinal conduit elements may explicitly comprise other transverse conduit elements and/or longitudinal conduit elements which are not cylindrical in shape and/or comprise manufacturing materials other than aluminum. In this respect, the transverse conduit elements and/or longitudinal conduit elements may each be formed identically to one another or differently from one another.

In the example shown in FIG. 1, two longitudinal conduit elements arranged adjacent to each other have an identical distance to each other. Furthermore, two transverse conduit elements arranged adjacent to each other also have an identical distance from each other. However, this is explicitly not necessary in all embodiments.

Furthermore, FIG. 1 shows that the longitudinal conduit elements L1, L2, L3, L4, L5 are each connected to the transverse conduit elements Q1, Q2, Q3, Q4, Q5 by connecting elements V. In the example shown in FIG. 1, the extinguishing agent conduit arrangement 100 comprises twenty-five connecting elements V connecting each longitudinal conduit element to each transverse conduit element. However, embodiments of the extinguishing agent conduit arrangement 100 in which one or more longitudinal conduit element(s) is/are each connected to only one transverse conduit element or to a part of the transverse conduit elements by a connecting element are explicitly also possible.

The connecting elements V provide a mechanically loadable connection between the longitudinal conduit elements L1, L2, L3, L4, L5 and the transverse conduit elements Q1, Q2, Q3, Q4, Q5, so that the transverse conduit elements are arranged on the longitudinal conduit elements, respectively. The connecting elements V are also each designed to conduct or distribute extinguishing water from one of the longitudinal conduit elements L1, L2, L3, L4, L5 into one of the transverse conduit elements Q1, Q2, Q3, Q4, Q5 or from one of the transverse conduit elements Q1, Q2, Q3, Q4, Q5 into one of the longitudinal conduit elements L1, L2, L3, L4, L5.

Further, FIG. 1 schematically shows an extinguishing agent supply line Z which, in the example shown, is connected to the transverse conduit element Q1 and is arranged to introduce extinguishing water into the extinguishing agent conduit arrangement 100 or into the interior of the longitudinal conduit elements L1, L2, L3, L4, L5 and transverse conduit elements Q1, Q2, Q3, Q4, Q5, each of which is in the form of aluminum tubes. In the example shown in FIG. 1, the extinguishing agent supply line Z is formed as a commercially available fire hose with an internal diameter of twenty-five millimeters, but other extinguishing agent supply lines are explicitly possible in other embodiments.

In the specific example of an extinguishing agent conduit arrangement shown schematically in FIG. 1, the longitudinal conduit elements L1, L2, L3, L4, L5 and the transverse conduit elements Q1, Q2, Q3, Q4, Q5 are each formed in one piece as aluminum tubes. However, the longitudinal conduit elements and/or transverse conduit elements may also be formed as telescopic elements, in particular as one-sided or two-sided telescopic elements. An advantage here is that the extinguishing agent conduit arrangement can be expanded from a transport state to an operating state. An advantage here is that the extinguishing agent conduit arrangement, on the one hand, can be transported compactly with retracted telescopic elements, for example with a commercial truck, and, on the other hand, can be operated with extended telescopic elements. Examples of suitable telescopic elements are shown in FIGS. 2 to 4.

FIG. 2 schematically shows an example of a transverse conduit element Q1 designed as a telescopic element with an outer element Q13 and four inner elements Q11, Q11', Q12, Q12' arranged at least partially in the outer element Q13 in a cross-sectional view. The inner elements Q11, Q11', Q12, Q12' shown in FIG. 2 are each arranged to be displaceable relative to the outer element Q13 and relative to the respective further inner elements. In the example shown, both the inner elements Q11, Q11', Q12, Q12' and the outer element Q13 are formed as tubular or cylindrical conduit elements with a circular cross-section, but in other embodiments inner elements and/or outer elements formed in a different way, for example with elliptical cross-sectional geometries, are explicitly possible.

A respective innermost inner element Q11, Q11' is arranged at least partially in a respective further inner element Q12, Q12', wherein the respective inner elements Q11, Q11', Q12, Q12' arranged at least partially one inside the other can each be positioned at least partially in the outer element Q13. The respective innermost inner elements Q11, Q11' are each closed at an outer end, so that the extinguishing water introduced into the telescopic element cannot escape at this respective outer end of the respective innermost inner elements Q11, Q11'.

The outer element Q13 is coupled to an extinguishing agent supply line Z. The extinguishing agent supply line Z is mechanically fixed to the outer element Q13 and is designed to introduce extinguishing water into the interior of the telescopic element. For this purpose, in the example shown in FIG. 2, the outer element Q13 comprises a corresponding extinguishing agent supply line receptacle (not shown) comprising an extinguishing agent inlet opening in the outer element Q13. The extinguishing agent supply line receptacle may further comprise a device for receiving the extinguishing agent supply line Z, for example a hose receptacle.

The inner elements Q11, Q11', Q12, Q12', which can be positioned at least partially in the outer element Q13, each have a contact section 15 with a respective further inner element or with the outer element Q13. In the example shown in FIG. 2, the contact sections are not sealed or at least not completely impermeable to extinguishing water. Rather, the inner elements Q11, Q11', Q12, Q12' are each partially accommodated or arranged with a clearance or a space for movement in each other or in the outer element Q13, so that displaceability of the inner elements relative to each other and relative to the outer element is ensured. An at least partial permeability of the contact sections 15 for extinguishing water and/or other fire extinguishing agents can be accepted in this case. Nevertheless, other embodiments are explicitly possible which have displaceable inner elements with contact sections impermeable to extinguishing agents with respect to further inner elements and/or outer elements. For example, rubber or plastic seals can be arranged or provided on the respective inner elements for this purpose, which prevent or at least reduce an extinguishing agent leakage from the contact sections in each case.

As schematically illustrated in FIG. 2b, the transverse conduit element Q1 in the form of a telescopic element has connecting elements V which are not shown in FIG. 2a merely for reasons of clarity. The connecting elements V shown each serve to mechanically connect the transverse conduit element Q1 to longitudinal conduit elements and to establish a connection, which connection is permeable to extinguishing water, between the interior spaces of the transverse conduit element Q1 and the interior spaces of the longitudinal conduit elements to be connected to the transverse conduit element Q1.

FIG. 2c schematically shows an expansion of the transverse conduit element Q1 formed as a telescopic element or a displacement of the inner elements Q11, Q11', Q12, Q12' relative to the outer element Q13 or relative to each other. As schematically shown in FIG. 2c, the expansion of the telescopic element may here be caused or at least supported by a physical pressure inside the telescopic element, wherein the physical pressure may be caused or brought about by the introduction or pumping of extinguishing water into the interior of the telescopic element. As shown schematically in FIG. 2c, the extinguishing water introduced into the interior of the telescopic element through the extinguishing water supply line may cause or convey a displacement of the inner elements out of the outer element, wherein at least a part of the inner elements is at least partially surrounded or enclosed by the outer element. Depending on an introduction pressure with which the extinguishing water is introduced or pumped into the telescopic element, a telescopic element internal pressure reduction caused by a partial discharge of the extinguishing water at the contact sections 15 of the inner elements can be accepted, provided that the remaining physical pressure in the interior of the telescopic element is sufficient to cause or convey a displacement of the inner elements Q11, Q11', Q12, Q12' relative to the outer element Q13 or relative to each other.

Alternatively or additionally, the displacement of the inner elements relative to the outer element or relative to each other may also be effected or at least conveyed with a cable pull mechanism (not shown) and/or an electromechanically and/or pneumatically driven displacement mechanism (not shown).

FIG. 3 shows a schematic cross-sectional view of an example of a longitudinal conduit element L1 designed as a telescopic element with an outer element L13 and four inner elements L11, L11', L12, L12' arranged at least partially in the outer element L13. The inner elements L11, L11', L12, L12' shown in FIG. 3 are each arranged to be displaceable relative to the outer element L13 and relative to the respective further inner elements. In the example shown, both the inner elements L11, L11', L12, L12' and the outer element L13 are formed as tubular or cylindrical conduit elements with a circular cross-section, however, in other embodiments, differently shaped inner elements and/or outer elements, for example with elliptical cross-sectional geometries, are explicitly possible.

A respective innermost inner element L11, L11' is arranged at least partially in a respective further inner element L12, L12', wherein the respective inner elements L11, L11', L12, L12' arranged at least partially one inside the other can each be positioned at least partially in the outer element L13. The respective innermost inner elements L11, L11' are each closed at an outer end, so that the extinguishing water introduced into the telescopic element cannot leak at this outer end of the respective innermost inner elements L11, L11'.

The inner elements L11, L11', L12, L12' which can be positioned at least partially in the outer element L13 each have a contact section 16 with a respective further inner element or with the outer element L13. In the example shown in FIG. 3, the contact sections are not sealed or at least not completely impermeable to extinguishing water. Rather, the inner elements L11, L11', L12, L12' are each partially accommodated or arranged with a clearance or a space for movement in each other or in the outer element L13, so that displaceability of the inner elements relative to each other and relative to the outer element is ensured. An at least partial permeability of the contact sections 16 for extinguishing water and/or other fire extinguishing agents can be accepted here. Nevertheless, other embodiments are explicitly possible which have displaceable inner elements with contact sections impermeable to extinguishing agents with respect to further inner elements and/or outer elements. For example, rubber or plastic seals can be arranged or provided on the respective inner elements for this purpose, which prevent or at least reduce an extinguishing agent leakage from the contact sections in each case.

As schematically illustrated in FIG. 3a, the longitudinal conduit element L1, which is in the form of a telescopic element, has connecting elements V. The connecting elements V shown are each used for mechanically connecting the longitudinal conduit element L1 to transverse conduit elements of the extinguishing agent conduit arrangement and for producing a connection between the interior spaces of the longitudinal conduit element L1 and the interior spaces of the transverse conduit elements to be connected to the longitudinal conduit element L1, which connection is permeable to extinguishing water.

FIG. 3b schematically shows an expansion of the longitudinal conduit element L1 formed as a telescopic element or a displacement of the inner elements L11, L11', L12, L12' relative to the outer element L13 or relative to each other. As schematically shown in FIG. 3b, the expansion of the telescopic element may here be caused or at least supported by a physical pressure inside the telescopic element, wherein the physical pressure may be caused or effected by the introduction or pumping of extinguishing water into the interior of the telescopic element. As schematically shown in FIG. 3b, the extinguishing water introduced into the interior of the telescopic element through the connecting elements V may cause or convey a displacement of the inner elements out of the outer element, wherein at least a part of the inner elements being at least partially surrounded or enclosed by the outer element. Depending on an introduction pressure with which the extinguishing water is introduced or pumped into the telescopic element, a telescopic element internal pressure reduction caused by a partial discharge of the extinguishing water at the contact sections 16 of the inner elements can be accepted, provided that the remaining physical pressure in the interior of the telescopic element is sufficient to cause or convey a displacement of the inner elements L11, L11', L12, L12' relative to the outer element L13 or relative to each other.

Alternatively or additionally, the displacement of the inner elements relative to the outer element or relative to each other may also be effected or at least conveyed with a cable pull mechanism (not shown) and/or an electromechanically and/or pneumatically driven displacement mechanism (not shown).

FIG. 4 shows further examples of transverse conduit elements Q1 or longitudinal conduit elements L3 formed as telescopic elements. The telescopic elements shown in FIGS. 4a to 4d each comprise an outer element Q13, L33 and two respective inner elements Q11, Q12, L31, L32 arranged at least partially in the outer element Q13, L33. The inner elements Q11, Q12, L31, L32 shown in FIG. 2 are each arranged displaceable relative to the outer element Q13, L33 and relative to the respective further inner element. In the example shown, both the inner elements Q11, Q12, L31, L32 and the outer elements Q13, L33 are formed as tubular or cylindrical conduit elements with a circular cross-section, but in other embodiments inner elements and/or outer elements formed in a different way, for example with elliptical cross-sectional geometries, are explicitly possible.

A respective innermost inner element Q11, L31 is arranged at least partially in a respective further inner element Q12, L32, wherein the respective inner elements Q11, Q12, L31, L32, which are arranged at least partially one inside the other, can each be positioned at least partially in the respective outer element Q13, L33. The respective innermost inner elements Q11, L31 are each closed at an outer end, so that the extinguishing water introduced into the telescopic element cannot leak at this respective outer end of the respective innermost inner elements Q11, L11.

As shown in FIG. 4, the telescopic element may in particular also be configured as a telescopic element which can be extended or expanded on one side. For this purpose, the outer element of the telescopic element may be closed or closable at an outer end, as shown in FIGS. 4a and 4b, and/or coupled or couplable to an extinguishing agent supply line Z, as shown in FIGS. 4c and 4d.

Figure 4B:
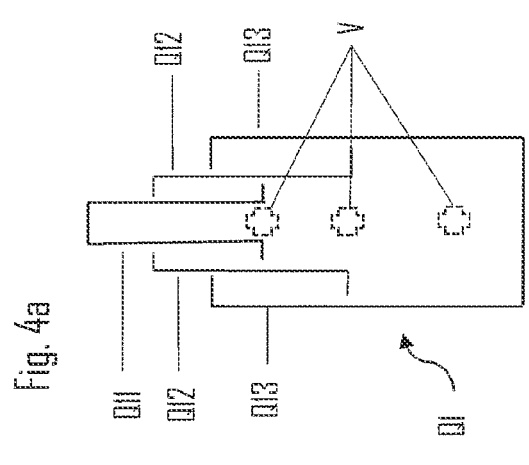
Figure 4C:
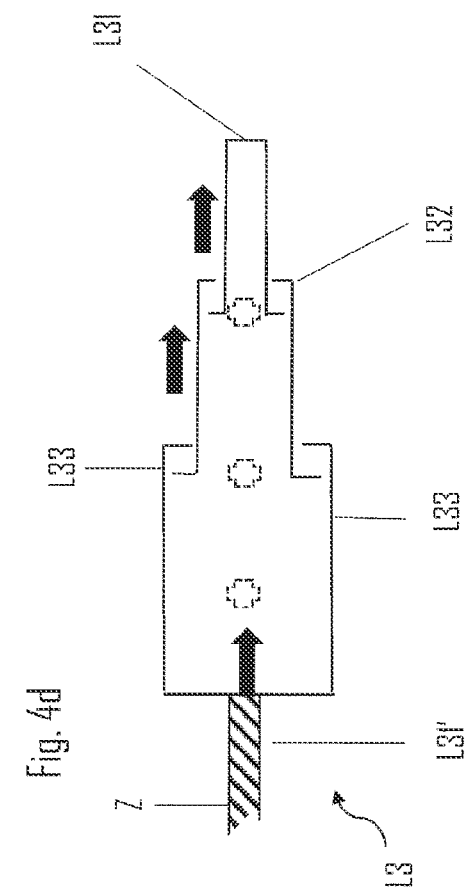

As shown in FIG. 4c, for example, an outer element L33 of a longitudinal conduit element configured as a telescopic element may be coupled to an extinguishing agent supply line Z. The extinguishing agent supply line Z is mechanically fixed to the outer element L33 and is designed to introduce extinguishing water into the interior of the telescopic element. For this purpose, in the example shown in FIG. 4, the outer element L33 comprises a corresponding extinguishing agent supply line receptacle (not shown) comprising an extinguishing agent inlet opening (not shown). The extinguishing agent supply line receptacle may further comprise a device for receiving the extinguishing agent supply line Z, for example a hose receptacle.

The inner elements Q11, Q12, L31, L32 which can be positioned at least partially in the outer element Q13, L33 each have a contact section with a respective further inner element or with the respective outer element. In the examples shown in FIG. 4, the contact sections are not sealed or at least not completely impermeable to extinguishing water. Rather, the inner elements Q11, Q12, L31, L32 are each partially accommodated or arranged in one another or in the outer element Q13, L33 with a mechanical clearance or space for movement, respectively, so that a displaceability of the inner elements relative to one another and relative to the outer element is ensured. An at least partial permeability of the contact sections for extinguishing water and/or other extinguishing agents can be accepted here. Nevertheless, other embodiments are explicitly possible which have displaceable inner elements with contact sections impermeable to extinguishing agents with respect to further inner elements and/or outer elements. For example, rubber or plastic seals can be arranged or provided on the respective inner elements for this purpose, which prevent or at least reduce an extinguishing agent leakage from the contact sections in each case.

Figure 4D:
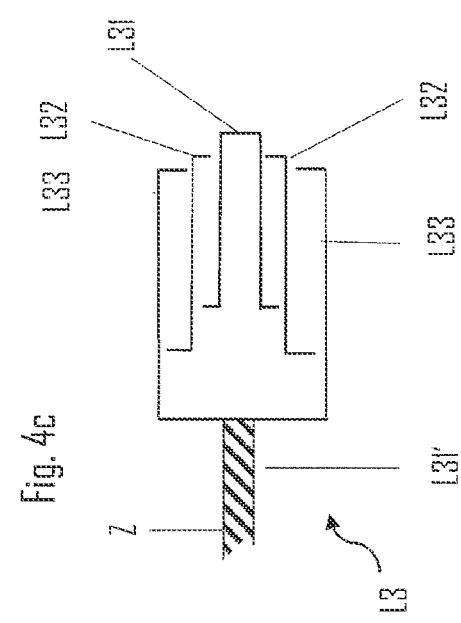

As schematically illustrated in FIGS. 4a and 4d, the longitudinal or transverse conduit elements designed as telescopic elements each have connecting elements V which are not shown in FIGS. 4b and 4c for reasons of overview.

The connecting elements V shown each serve to mechanically connect the transverse conduit elements and longitudinal conduit elements and to produce a connection between the interior spaces of the transverse conduit elements and the longitudinal conduit elements which is permeable to extinguishing water.

FIGS. 4c and 4d schematically show an expansion of the telescopic elements or a displacement of the inner elements Q11, Q12, L31, L32 relative to the respective outer elements Q13, L33 or relative to each other. The expansion of the telescopic elements can here, analogously to the telescopic elements shown in FIGS. 2 and 3, be caused or at least supported by a physical pressure in the interior of the telescopic element, wherein the physical pressure can be caused or effected by the introduction or pumping of extinguishing water into the interior of the respective telescopic element.

Depending on an introduction pressure with which the extinguishing water is introduced or pumped into the telescopic element, a telescopic element internal pressure reduction caused by a partial discharge of the extinguishing water at the contact sections of the inner elements can be accepted, provided that the remaining physical pressure in the interior of the telescopic element is sufficient to cause or promote a displacement of the inner elements Q11, Q12, L31, L32 relative to the respective outer elements Q13, L33 or relative to each other.

Alternatively or additionally, the displacement of the inner elements relative to the outer element or relative to each other may also be effected or at least conveyed with a cable pull mechanism (not shown) and/or an electromechanically and/or pneumatically driven displacement mechanism (not shown).

In deviation from the examples shown in FIGS. 2 to 4 for longitudinal conduit elements and transverse conduit elements formed as telescopic elements, telescopic elements with a deviating number of inner elements are explicitly also possible. In one variant, a longitudinal or transverse conduit element formed as a telescopic element may, for example, comprise only a single inner element which is at least partially surrounded by an outer element and is displaceable relative thereto.

In another variant, a longitudinal or transverse conduit element configured as a telescopic element, in particular as a telescopic element expandable on one side, may have, for example, four inner elements displaceable relative to one another and an outer element, the four inner elements each being arranged at least partially in a respective further one of the inner elements and/or at least partially in the outer element.

FIG. 5 shows an example of an extinguishing agent conduit arrangement 200 with five longitudinal conduit elements L1, L2, L3, L4, L5 and five transverse conduit elements Q1, Q2, Q3, Q4, Q5 in a top view, wherein the longitudinal and transverse conduit elements are each formed as telescopic elements with tubular inner and outer elements. However, embodiments of the extinguishing agent conduit arrangement 200 with any number of longitudinal and transverse conduit elements formed as telescopic elements are explicitly also possible, wherein a respective number of the longitudinal conduit elements and the transverse conduit elements may be identical or different.

FIG. 5 shows the extinguishing agent conduit arrangement 200 with inner elements at least partially displaced out of the respective outer elements Q13, Q23, Q33, Q43, Q53, L13, L23, L33, L43, L53. The extinguishing agent conduit arrangement 200 shown schematically in a top view in FIG. 5 is in an operating state, wherein the transverse and longitudinal conduit elements L1, L2, L3, L4, L5, Q1, Q2, Q3, Q4, Q5 formed as telescopic elements are respectively extended or expanded with respect to a transport state of the extinguishing agent conduit arrangement 200. In other words, it may be described that an area enclosed by the longitudinal conduit elements and the transverse conduit elements in cooperation may be enlarged during an operational state of the extinguishing agent conduit arrangement 200 with respect to a transport state of the extinguishing agent conduit arrangement 200, wherein the enlargement may in particular be caused by a displacement of (telescopic) inner elements with respect to (telescopic) outer elements. It can thus be described that the extinguishing agent conduit arrangement can be extended or enlarged in a first direction X and in a second direction Y orthogonal to the first direction X, in an operational state compared to a transport state.

Expanding the extinguishing agent conduit arrangement 200 from a transport state to the operating state shown may occur before or during an operation.

In the example shown in FIG. 5, the extinguishing agent conduit arrangement 200 comprises transverse and longitudinal conduit elements L1, L2, L3, L4, L5, Q1, Q2, Q3, Q4, Q5, each expandable on both sides and formed as telescopic elements, as shown by way of example in FIGS. 2 and 3. However, in another embodiment, for example, an arrangement of telescopic elements expandable on one side, as exemplarily shown in FIG. 4, may also form the extinguishing agent conduit arrangement.

Furthermore, FIG. 5 shows an extinguishing agent supply line Z arranged on a transverse conduit element Q1, as also shown by way of example in FIG. 3. However, in other embodiments, the extinguishing agent supply line Z can also be arranged on one of the longitudinal conduit elements, as shown for example in FIG. 4.

For reasons of clarity, FIG. 5 does not show the connecting elements V which, analogous to the example shown in FIG. 1, mechanically couple the longitudinal conduit elements L1, L2, L3, L4, L5 to the transverse conduit elements Q1, Q2, Q3, Q4, Q5. The connecting elements V, which are not shown here, also enable extinguishing water to be transferred from the longitudinal conduit elements to the transverse conduit elements or from the transverse conduit elements to the longitudinal conduit elements in the extinguishing agent conduit arrangement 200 shown in FIG. 5.

When the respective inner elements of a telescopic element are displaced relative to the respective outer element of the telescopic element, a distance between two connecting elements can change in each case, as is also shown in FIGS. 2 to 4. Since the connecting elements are each mechanically loadably fixed to the respective longitudinal and transverse conduit elements, the connecting elements can ensure or force a uniform or mutually synchronized expansion or displacement of the inner elements of the respective longitudinal and transverse conduit elements.

FIG. 6 shows an extinguishing agent conduit arrangement 200 according to FIG. 5, wherein a plurality of flight-capable carrier devices D are arranged on the extinguishing agent conduit arrangement 200 or are mechanically loadably coupled thereto. In another embodiment, the flight-capable carrier devices D may also be arranged on the extinguishing agent conduit arrangement 100 shown in FIG. 1, for example.

In the example shown, the flight-capable carrier devices D are respectively arranged or fixed in the region of the crossing points of the transverse and longitudinal conduit elements, although this is not necessary in all embodiments.

The number and the positioning of the flight-capable carrier devices D may be determined as a function of the dimensions and/or the weight of the extinguishing agent conduit arrangement and the extinguishing water and/or other fire extinguishing agent supplied thereto. Furthermore, a desired flight altitude to be reached or a desired flight speed may also be taken into account in the positioning and/or dimensioning of the individual flight-capable carrier devices D.

In the example shown, the flight-capable carrier devices D are commercially available helicopter drones which are each configured, individually and/or in cooperation, for lifting an extinguishing agent conduit arrangement together with the device elements mechanically coupled thereto and for keeping the extinguishing agent conduit arrangement together with the device elements mechanically connected thereto, quasi floating, in a predetermined position in the earth's atmosphere.

Furthermore, FIG. 6 shows that the flight-capable carrier devices D are each connected to a control and power supply line S, which permits the use of a ground-based control device and a power supply device for controlling and supplying power to the flight-capable carrier devices D. In the example shown, the control and power supply line S is formed as a combined data and power transmission cable, but this is not necessary in all embodiments. In particular, a control line and a power supply line can also be formed separately from each other. Furthermore, it is also possible to provide a bundle of individual control lines and/or power supply lines, which are each connected to a flight-capable carrier device and/or a group of flight-capable carrier devices, for controlling and/or supplying power to the flight-capable carrier devices.

Further, FIG. 6 shows that a flight-capable supply line carrier device DZ is arranged on or mechanically attached to the extinguishing agent supply line Z. The flight-capable supply line carrier device DZ can at least partially lift the extinguishing agent supply line Z and/or at least support a lifting or holding of the extinguishing agent supply line Z. Since in particular the extinguishing agent supply line Z filled with fire extinguishing agent may have a not inconsiderable weight, the flight-capable carrier devices D which lift or hold the extinguishing agent conduit arrangement together with the device elements mechanically connected thereto can at least be relieved by the use of supply line carrier devices DZ arranged on the extinguishing agent supply line Z.

Furthermore, FIG. 6 shows that the supply line carrier device DZ is also connected to the control and power supply line S, so that the supply line carrier device DZ can also be supplied with control signals and operating power by a ground-based control device and a ground-based power supply device.

FIG. 7 shows, by way of example and in schematic form, a fire extinguishing or fire prevention device 1000 during a fire extinguishing or fire prevention operation. An extinguishing agent conduit arrangement 100, 200, as shown in the preceding FIGS., is lifted and held or positioned by a plurality of flight-capable carrier devices D at a distance H, for example 100 meters, from the ground surface. In other words, it can be described that there is at least substantially no relative velocity between the ground surface or an application area B and the fire extinguishing or fire prevention device 1000.

The fire extinguishing or fire prevention device 1000 shown in FIG. 7 with the plurality of flight-capable carrier devices D is adapted to be controlled by a ground-based control device (not shown), wherein in particular a positioning of the extinguishing agent conduit arrangement 100, 200 with the plurality of flight-capable carrier devices D can be performed above the ground surface. In other words, it may be described that in the example shown, the plurality of flight-capable carrier devices D are arranged to reposition the extinguishing agent conduit arrangement 100, 200 and the device elements mechanically connected thereto in three-dimensional space, in accordance with control signals from an automated and/or manually operable control system. For this purpose, individual flight-capable carrier devices, groups of flight-capable carrier devices or all carrier devices can be manipulated in their flight behaviour. In particular, individual parameters of the respective flight-capable carrier devices D such as, for example, a rotor power and/or a rotor pitch angle can also be controlled and/or regulated by a ground-based control device in an automated or in an operator-induced manner.

In the example shown in FIG. 7, the flight-capable carrier devices D are controlled by the ground-based control device (not shown) and supplied with operating power from a ground-based power supply device (not shown), for example a power supply network connection or a deployable generator unit. The control signals from the control device and the operating power are supplied to the flight-capable carrier devices D via a combined power supply and data line, which in the example shown is formed together with, or is arranged on, an extinguishing agent supply line Z.

Further, FIG. 7 shows that the extinguishing agent conduit arrangement 100, 200 positioned above an application area B to be sprinkled or sprayed with extinguishing water or other fire extinguishing agent, which is a predetermined or predeterminable portion of the ground surface, is connected via the extinguishing agent supply line Z to an extinguishing agent reservoir 300, in the example shown to a water-filled tanker truck.

The tanker truck shown in FIG. 7 comprises a commercially available high-pressure pump which pumps the extinguishing water into the extinguishing agent supply line Z. In this case, the high-pressure pump is set up to generate a water pressure which pumps the extinguishing water into the extinguishing agent conduit arrangement 100, 200 counter to the force of gravity acting on the extinguishing water and counter to the frictional and flow resistances occurring in the extinguishing agent supply line Z.

Furthermore, FIG. 7 shows that the extinguishing agent supply line Z is kept in a predetermined position in the earth's atmosphere by a supply line carrier device DZ arranged thereon. In the example shown, the supply line carrier device DZ is also supplied with operating power and control signals by the combined power supply and data line formed together with the extinguishing agent supply line Z. By holding the extinguishing agent supply line Z, the supply line carrier device DZ relieves the multiple flight-capable carrier devices D.

An advantage of the fire extinguishing or fire prevention device 1000 shown in FIG. 7 is that it can be continuously and quasi-infinitely supplied with operating power, control signals and fire extinguishing agents, in particular with extinguishing water, so that a fire extinguishing or fire prevention operation can be performed continuously and for an unlimited period of time.

The extinguishing water pumped from the extinguishing agent reservoir 300 via the extinguishing agent supply line Z into the extinguishing agent conduit arrangement 100, 200 is continuously discharged by the fire extinguishing or fire prevention device shown in FIG. 7 and distributed uniformly over the application area B. In this way, similar to a suddenly occurring heavy rain, a fire, in particular a wildfire, is effectively fought and/or the application area B is moistened in such a way that the spread of a fire, in particular a wildfire, is at least counteracted.

For discharging the extinguishing water, the device shown in FIG. 7 comprises a plurality of outlets A each configured as spray nozzles and arranged on the extinguishing agent conduit arrangement 100, 200. The spray nozzles arranged on the extinguishing agent conduit arrangement 100, 200 are each arranged and designed to discharge the extinguishing water pumped into the extinguishing agent conduit arrangement 100, 200 from the extinguishing agent conduit arrangement 100, 200 and to distribute or scatter the discharged extinguishing water at least partially widely over the application area B in the process.

For this purpose, the spray nozzles or outlets A are each arranged opposite the flight-capable carrier devices D on an outer side of the extinguishing agent conduit arrangement 100, 200. However, this is explicitly not necessary in all embodiments.

FIG. 8 shows another example of the arrangement of the outlets A11 . . . . A51' on an extinguishing agent conduit arrangement 200, as shown for example in FIG. 5 and FIG. 6. In the example shown in FIG. 8, the outlets A11 . . . . A51' are respectively arranged at the inner elements or at the outer elements of the longitudinal conduit elements which are respectively formed as telescopic elements. In other embodiments, the transverse conduit elements and/or the connecting elements can also have outlets for discharging fire extinguishing agent, in particular extinguishing water.

The outlets A11 . . . . A51' shown in FIG. 8 are arranged on the extinguishing agent conduit arrangement 200 respectively opposite to the flight-capable carrier devices D (not shown in FIG. 8 for overview reasons) and are formed as extinguishing agent spray nozzles. In other words, it can be described that the outlets each formed as extinguishing agent spray nozzles are arranged on an outer side of the extinguishing agent conduit arrangement 200 facing away from the flight-capable carrier devices D. However, this is explicitly not necessary in every embodiment of the device.

Furthermore, the outlets A11 . . . . A51' shown in FIG. 8 and designed as extinguishing agent spray nozzles are each suitable for discharging the extinguishing water from the interior of the longitudinal conduit elements, the longitudinal conduit elements designed as telescopic elements each having recesses in the inner or outer elements for this purpose, which allow the extinguishing water to be fed to the extinguishing agent spray nozzles. In other embodiments, the outlets A11 . . . . A51' can also be formed directly by recesses in the longitudinal conduit elements and/or transverse conduit elements.

The extinguishing agent spray nozzles A11 . . . . A51' shown in FIG. 8 are further arranged and configured to discharge the extinguishing water and/or other fire extinguishing agent from the extinguishing agent conduit arrangement 200 and/or from the longitudinal conduit elements at least substantially perpendicular to the ground surface. If the extinguishing agent conduit arrangement 200 is positioned or lifted or held at a distance, for example at a distance of one hundred meters, from the surface of the earth during the discharge of the extinguishing water and/or fire extinguishing agent, the extinguishing water and/or fire extinguishing agent discharged substantially perpendicularly to the surface of the earth is distributed independently and/or solely due to the natural air resistance on its way towards the ground surface over a application area B, wherein the impulses and forces caused by the extinguishing agent discharge, which respectively act on the extinguishing agent conduit arrangement 200, act on the extinguishing agent conduit arrangement 200 at least substantially parallel to the earth's gravitational force. The impulses and forces caused by the extinguishing agent discharge can thus be easily compensated by the flight-capable carrier devices D. Optionally, the control device may be arranged to automatically compensate for the pulses and forces caused by the extinguishing agent discharge by adjusting the operating power of the flight-capable carrier devices D.

As a possible optional further development, FIG. 8 additionally shows side extinguishing agent spray nozzles AQ1 . . . . AQ5' and AL1 . . . . AL5' arranged laterally on the extinguishing agent conduit arrangement 200 or on the longitudinal and transverse conduit elements. The optionally implementable side extinguishing agent spray nozzles AQ1 . . . . AQ5' and AL1 . . . . AL5' are each controllable or closable extinguishing agent spray nozzles, which are closable or closed or impermeable to the fire extinguishing agent in particular during a displacement of the respective inner elements of the longitudinal and transverse conduit elements which are each configured as telescopic elements. Preferably, the side extinguishing agent spray nozzles AQ1 . . . . AQ5' and AL1 . . . . AL5', as shown in FIG. 8, may each be arranged in pairs and opposite each other laterally on a respective longitudinal and transverse conduit element of the extinguishing agent conduit arrangement 200. The lateral extinguishing agent spray nozzles AQ1 . . . . AQ5' and AL1 . . . . AL5' shown in FIG. 8 are each arranged and configured to discharge the extinguishing water or fire extinguishing agent from the interior of the respective longitudinal and transverse conduit elements at least substantially parallel to the ground surface. As shown schematically in FIG. 9 below, the application area B to be covered with extinguishing water or fire extinguishing agent by the fire extinguishing or fire prevention device can thereby be further increased, wherein the impulses or forces caused by the lateral extinguishing water or fire extinguishing agent outlet, which act on the extinguishing agent conduit arrangement shown, are in each case at least partially compensated with each other. Due to the at least partially opposing impulses or forces, which at least partially compensate each other, a control or regulation of the flight-capable carrier devices D is enhanced in comparison to an asymmetrical or non-paired arrangement of side extinguishing agent spray nozzles on the extinguishing agent conduit arrangement.

Furthermore, the outlets A11 . . . . A51', AQ1 . . . . AQ5' and AL1 . . . . AL5' shown in FIG. 8 can be configured to be controlled or regulated, in particular opened or closed or activated or deactivated, in each case individually or in groups in an automated and/or in an operator-induced manner by the control device. The control or regulation of the outlets may in this case be linked and/or correlated with a control or regulation of the flight-capable carrier devices D, in particular by the control device. In other words, it can be described that an operating state of the individual outlets can be taken into account in an, in particular automated, control or regulation of the flight-capable carrier devices D.

It is understood that the exemplary embodiments previously explained are not exhaustive and do not limit the subject-matter disclosed herein. In particular, it will be apparent to those skilled in the art that they may combine the features described as desired and/or omit various features without departing from the subject-matter disclosed herein.

The invention claimed is:

1. A fire extinguishing or fire prevention device comprising
    an extinguishing agent conduit arrangement with
        a plurality of longitudinal conduit elements, each of which is suitable for conducting a fire extinguishing agent, and
        a plurality of transverse conduit elements, each of which is suitable for conducting the fire extinguishing agent, wherein
        both the longitudinal conduit elements and the transverse conduit elements are constructed as telescopic elements, each telescopic element comprising an inner element and an outer element at least partially sur-rounding the inner element, the inner element being displaceable relative to the outer element, wherein
            each of the longitudinal conduit elements is connected to at least one of the transverse conduit elements by at least one connecting element, wherein
            the connecting elements are each adapted to conduct at least a part of the fire extinguishing agent from one of the longitudinal conduit elements into one of the transverse conduit elements or from one of the transverse conduit elements into one of the longitudinal conduit elements;
    at least one extinguishing agent supply line which is arranged on the extinguishing agent conduit arrangement and is suitable for introducing the fire extinguishing agent into at least one of the longitudinal conduit elements or the transverse conduit elements;
    a plurality of outlets each disposed on the extinguishing agent conduit arrangement and adapted to discharge the fire extinguishing agent from the extinguishing agent conduit arrangement;
    at least one flight-capable carrier device which is arranged on the extinguishing agent conduit arrangement and is suitable for lifting the extinguishing agent conduit arrangement with the outlets and at least a part of the extinguishing agent supply line to a distance from the ground surface during a fire extinguishing or fire prevention operation of the fire extinguishing or fire prevention device and for keeping the extinguishing agent conduit arrangement at least temporarily at a distance from the ground surface; and
    a ground-based extinguishing agent reservoir connected to the extinguishing agent supply line and adapted to provide and introduce the fire extinguishing agent into the extinguishing agent supply line and thereby provide the fire extinguishing agent to the extinguishing agent conduit arrangement during a fire extinguishing or fire prevention operation of the fire extinguishing or fire prevention device;
    at least one operating power supply line which is connected to the at least one flight-capable carrier device and is arranged to provide the at least one flight-capable carrier device with electrical operating power, wherein the operating power supply line is further connected to a stationary or deployable ground-based power supply device.

2. The device according to claim 1, characterized in that,
at least some of the outlets are formed as extinguishing agent spray nozzles or extinguishing agent sprinkler nozzles, and/or
at least some of the outlets discharge the fire-extinguishing agent perpendicularly to the surface of the ground.

3. The device according to claim 1, wherein
at least some of the outlets are adapted to discharge the fire-extinguishing agent parallel to the ground surface, characterized in that
a counterforce caused by the at least substantially parallel to the ground surface discharged fire extinguishing agent, which effects on the extinguishing agent conduit arrangement, is at least partially compensated by a force opposing the counterforce, which is also caused by a discharge of fire extinguishing agent.

4. The device according to claim 1, wherein the ground-based extinguishing agent reservoir is a tanker or a water tank.

5. The device according to claim 1, further comprising
at least one flight-capable supply line carrier device which is arranged on the extinguishing agent supply line and is suitable for lifting at least a part of the extinguishing agent supply line to a distance from the ground surface and for keeping it at least temporarily at a distance from the ground surface,
characterized in that
the extinguishing agent supply line is connected to the extinguishing agent reservoir, wherein the extinguishing agent reservoir is adapted to provide the fire extinguishing agent to the extinguishing agent conduit arrangement while the extinguishing agent supply line is lifted or kept by the at least one flight-capable supply line carrier device.

6. The device according to claim 1, wherein the at least one flight-capable carrier device is an unmanned aerial vehicle, UAV.

7. The device according to claim 1, further comprising
at least one control line connected to the at least one flight-capable carrier device and arranged to provide a control signal to the at least one flight-capable carrier device, wherein
the control line is connected to a stationary or deployable control device.

8. The device according to claim 1, wherein
at least a part of the longitudinal conduit elements or of the transverse conduit elements each comprises a manufacturing material with or made of metal.

9. The device according to claim 1, characterized in that
the at least one inner element of a telescopic element is closed and/or closable at an outer end, and/or
the displacement of the at least one inner element relative to the outer element is to be effected at least partly by a pressure in the interior of the longitudinal conduit element or of the transverse conduit element designed as a telescopic element, the pressure being effected in particular by the introduction of the fire extinguishing agent into the extinguishing agent conduit arrangement, and/or
the displacement of the inner element with respect to the outer element is to be effected at least partly by a cable pull mechanism, and/or
the displacement of the inner element with respect to the outer element is to be effected at least partially by an electromechanical displacement device.

10. The device according to claim 1, further comprising
at least one sensor device, which is configured to
detect a fire or a part of a fire and/or a fire propagation direction.

11. A method for fire prevention and extinguishing a fire including the steps:
Providing a device comprising:
- an extinguishing agent conduit arrangement with
  - a plurality of longitudinal conduit elements, each of which is suitable for conducting a fire extinguishing agent, and
  - a plurality of transverse conduit elements, each of which is suitable for conducting the fire extinguishing agent, wherein
  - both the longitudinal conduit elements and the transverse conduit elements are constructed as telescopic elements, each telescopic element comprising an inner element and an outer element at least partially sur-rounding the inner element, the inner element being displaceable relative to the outer element, wherein
  - each of the longitudinal conduit elements is connected to at least one of the transverse conduit elements by at least one connecting element, wherein
  - the connecting elements are each adapted to conduct at least a part of the fire extinguishing agent from one of the longitudinal conduit elements into one of the transverse conduit elements or from one of the transverse conduit elements into one of the longitudinal conduit elements;
- at least one extinguishing agent supply line which is arranged on the extinguishing agent conduit arrangement and is suitable for introducing the fire extinguishing agent into at least one of the longitudinal conduit elements or the transverse conduit elements;
- a plurality of outlets each disposed on the extinguishing agent conduit arrangement and adapted to discharge the fire extinguishing agent from the extinguishing agent conduit arrangement;
- at least one flight-capable carrier device which is arranged on the extinguishing agent conduit arrangement and is suitable for lifting the extinguishing agent conduit arrangement with the outlets and at least a part of the extinguishing agent supply line to a distance from the ground surface during a fire extinguishing or fire prevention operation of the fire extinguishing or fire prevention device and for keeping the extinguishing agent conduit arrangement at least temporarily at a distance from the ground surface; and
- a ground-based extinguishing agent reservoir connected to the extinguishing agent supply line and adapted to provide and introduce the fire extinguishing agent into the extinguishing agent supply line and thereby provide the fire extinguishing agent to the extinguishing agent conduit arrangement during a fire extinguishing or fire prevention operation of the fire extinguishing or fire prevention device;
- at least one operating power supply line which is connected to the at least one flight-capable carrier device and is arranged to provide the at least one flight-capable carrier device with electrical operating power, wherein
- the operating power supply line is further connected to a stationary or deployable ground-based power supply device;

Lifting the extinguishing agent conduit arrangement and at least a part of the extinguishing agent supply line with the at least one flight-capable carrier device to a predetermined distance from the ground surface;

Relocating the extinguishing agent conduit arrangement and at least a portion of the extinguishing agent supply line over a predetermined target area;

Introducing the fire extinguishing agent from the extinguishing agent reservoir into the extinguishing agent conduit arrangement through the extinguishing agent supply line;

Discharging the fire extinguishing agent from the extinguishing agent conduit arrangement;

wherein
the at least one flight-capable carrier device is connected by the operating power supply line to the stationary or deployable ground-based power supply device.

* * * * *